US012637997B2

(12) United States Patent
Wadsworth

(10) Patent No.: US 12,637,997 B2
(45) Date of Patent: May 26, 2026

(54) OCEAN WAVE AND TIDAL CURRENT ENERGY CONVERSION SYSTEM

(71) Applicant: Ray Wadsworth, Oakley, ID (US)

(72) Inventor: Ray Wadsworth, Oakley, ID (US)

( * ) Notice: Subject to any disclaimer, the term of this patent is extended or adjusted under 35 U.S.C. 154(b) by 0 days.

(21) Appl. No.: 19/312,514

(22) Filed: Aug. 28, 2025

(65) Prior Publication Data

US 2025/0376968 A1 Dec. 11, 2025

Related U.S. Application Data

(63) Continuation-in-part of application No. 18/369,581, filed on Sep. 18, 2023, which is a continuation-in-part of application No. 18/140,740, filed on Apr. 28, 2023, now Pat. No. 11,788,503.

(60) Provisional application No. 63/438,455, filed on Jan. 11, 2023.

(51) Int. Cl.
*F03B 13/14* (2006.01)
*F03B 13/26* (2006.01)

(52) U.S. Cl.
CPC .............. *F03B 13/14* (2013.01); *F03B 13/26* (2013.01); *F05B 2220/61* (2013.01)

(58) Field of Classification Search
CPC ........ F03B 13/14; F03B 13/26; F03B 13/264; F03B 13/16; F03B 13/18; F03B 13/141; F03B 13/142; F03B 13/144; F03B 13/145; F03B 13/00; F03B 13/20
See application file for complete search history.

(56) References Cited

U.S. PATENT DOCUMENTS

| | | | | |
|---|---|---|---|---|
| 7,855,468 | B2 | 12/2010 | Lin | |
| 8,829,704 | B2 * | 9/2014 | Grigg | F03D 3/068 290/55 |
| 8,916,987 | B2 * | 12/2014 | Schultz | F03B 13/10 290/53 |
| 8,933,575 | B2 | 1/2015 | Lipman | |
| 10,060,407 | B2 | 8/2018 | Elefant et al. | |
| 10,774,806 | B1 * | 9/2020 | Lu | F03B 17/065 |
| 11,536,244 | B2 * | 12/2022 | Wilson | F03B 17/064 |
| 2008/0231057 | A1 | 9/2008 | Zeuner | |
| 2010/0172698 | A1 | 7/2010 | Ives et al. | |
| 2021/0047993 | A1 * | 2/2021 | Zhong | F03B 13/20 |

* cited by examiner

*Primary Examiner* — Nathaniel E Wiehe
*Assistant Examiner* — Maxime M Adjagbe

(57) ABSTRACT

An ocean wave and tidal current energy conversion system includes a frame that has supports that receive cylinders or rotating portions that rotate from ocean or river currents to create hydraulic oil pressure via hydraulic cylinders. The hydraulic oil in the energy conversion system is pumped into a pressure accumulator that removes hydraulic surges and operates an electric generator. The electric generator may power an electrolysis batch system for the production of hydrogen.

5 Claims, 26 Drawing Sheets

OCEAN WAVE AND TIDAL CURRENT ENERGY CONVERSION SYSTEM

CROSS-REFERENCE TO RELATED APPLICATIONS

This application is a continuation-in-part of U.S. Non-Provisional patent application Ser. No. 18/369,581 filed on Sep. 18, 2023, which is a continuation-in-part of U.S. Non-Provisional patent application Ser. No. 18/140,740 filed on Apr. 28, 2023, now U.S. Non-Provisional patent Ser. No. 11/788,503 issued on Oct. 17, 2023, which claims the benefit of U.S. Provisional Application Ser. No. 63/438,455, filed on Jan. 11, 2023, all of which are incorporated herein by reference.

TECHNICAL FIELD

The present disclosure relates to a system to convert ocean wave and tidal current energy. More particularly, the present disclosure relates to a system to convert ocean wave and tidal current energy into hydrogen.

BACKGROUND

Energy production is essential to modern life. As we progress as a society, clean energy has become an important endeavor for many countries. Accordingly, many have turned to solar or windmills to receive necessary power. However, this type of clean energy is often ineffective and does not produce the desired results. Another source of potential energy collection is found in the ocean. The ocean covers the majority of earth and is constantly moving in the form of waves and current. This movement is produced by wind and tide from lunar cycles. With the constant movement of the ocean, there is a lot of potential energy that could be utilized.

Some have attempted to harness the power found in the ocean, but all too often these processes and systems are expensive. Not only are these processes and systems expensive, but many of them have a large carbon footprint and are inefficient in producing energy. Components to form these systems can be difficult to find, making them expensive. These systems may have difficulty being mass produced and, thus, lack availability to people around the world.

Accordingly, there is a need for a system that converts energy from ocean waves and currents to hydrogen in an efficient, inexpensive, and clean manner. The present invention seeks to solve these and other problems.

SUMMARY OF EXAMPLE EMBODIMENTS

In one embodiment, an ocean wave and tidal current energy conversion system (hereinafter referred to as the "energy conversion system") comprises a first vessel (e.g., pressure tank) and a second vessel (e.g., pressure tank), the first vessel being parallel and spaced apart from the second vessel. The first vessel may comprise a plurality of frame members coupleable to an upper surface and lower surface of both the first and second vessels. Further, the first and second vessels may be positioned with a first and second anchor so as to be facing the waves or current in a pitch position.

The frame members are positioned so as to receive supports that couple the first vessel to the second vessel. Each of the supports comprise arms to receive cylinders. The energy conversion system may comprise numerous cylinders with fins that rotate with the ocean waves or currents. Some cylinders may be coupled to the arms of the supports. The energy conversion system may comprise a third vessel and a fourth vessel, both of which may be shorter than the first and second vessels. The third and fourth vessels may be positioned between the first and second vessels, being parallel thereto. The third and fourth vessels may be rotatably coupled to the first and second vessels via an axle.

Positioned between the third and fourth vessels may be additional cylinders with fins, which may be rotatably coupled to these cylinders. The third and fourth vessels may have a teeter totter effect on the axle due to swells on the ocean. The third and fourth vessels are spread apart to maximize the roll effect from average wave action. This will allow the axle to rotate back and forth, which allows relative motion energy to be transferred to create hydraulic oil pressure via hydraulic cylinders. In addition, due to the fins on the cylinders, the cylinders can rotate, which creates rotational energy that may be configured to operate rotary hydraulic pumps that would also contribute hydraulic oil flow and pressure.

The energy conversion system may also comprise a housing that rests on and is secured to one of the supports. The housing may receive mechanical and electrical components.

In some embodiments, the hydraulic oil in the energy conversion system is pumped into a pressure accumulator that removes hydraulic surges and operates an electric generator. The electric generator may power an electrolysis batch system for the production of hydrogen that fills each vessel with hydrogen gas. The configuration of the energy conversion system, in addition to the anchors, allows the system to be aligned with the oncoming waves so as to maximize efficiency of the system. Waves and tidal currents translate into transferred hydraulic pressure and flow via the system. With the pressure and flow, the generators can produce electricity. Then the electricity can be used to produce hydrogen.

In one embodiment, an energy conversion system comprises a first vessel and a second vessel. A first support may be positioned at a first end of the first and second vessels. A second support may be positioned at a second end of the first and second vessels. Positioned between and coupled to the first and second supports is a turbine that creates energy from ocean and river current.

In one embodiment, an energy conversion system comprises a first vessel and a second vessel. Proximate the first vessel, there may be a first support and a second support. Proximate the second vessel, there may be a third support and a fourth support. The first, second, third, and fourth supports may couple to the first and second vessels via a first axle, a second axle, and a third axle. A first member, a second member, a third member, and a fourth member may be coupled to and interposed between the second and fourth supports. The first axle, second axle, and third axle may rotate back and forth (e.g., teeter totter motion), which allows relative motion energy to be transferred so as to create hydraulic oil pressure via the hydraulic cylinders.

In one embodiment, an energy conversion system may comprise a first vessel and a second vessel on a first side and a third vessel and a fourth vessel on a second side. The first and second vessels may create a first unit, and the third and fourth vessels may create a second unit. Interposed between the first and second vessels may be a plurality of first turbines and a plurality of first supports. In addition, interposed between the third and fourth vessels may be a plurality of second turbines and a plurality of second supports. The first unit and second unit may both be hingedly coupled to a first member. The first and second units may be in a first position when being towed and then moved to a second position when placed in a water source.

DETAILED DESCRIPTION OF EXAMPLE EMBODIMENTS

Figure 1:
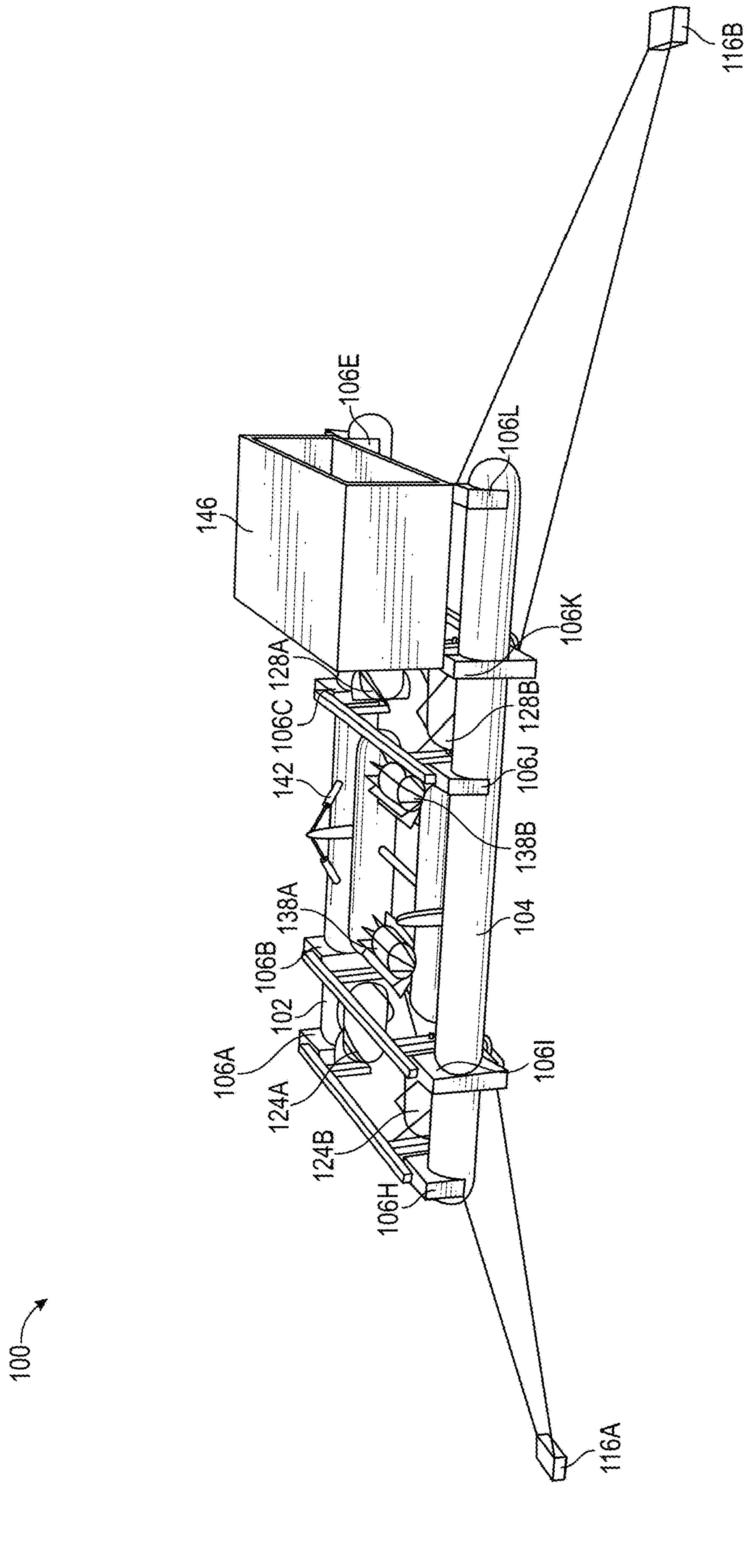
FIG. 1 illustrates a side perspective view of an ocean wave and tidal current energy conversion system.

While embodiments of the present disclosure may be subject to various modifications and alternative forms, specific embodiments have been shown by way of example in the drawings and will be described in detail herein. However, the present disclosure is not intended to be limited to the particular features, forms, components, etc. disclosed. Rather, the present disclosure will cover all modifications, equivalents, and alternatives falling within the scope of the present disclosure.

Reference to the invention, the present disclosure, or the like are not intended to restrict or limit the invention, the present disclosure, or the like to exact features or steps of any one or more of the exemplary embodiments disclosed herein. References to "one embodiment," "an embodiment," "alternate embodiments," "some embodiments," and the like, may indicate that the embodiment(s) so described may include a particular feature, structure, or characteristic, but not every embodiment necessarily includes the particular feature, structure, or characteristic.

Any arrangements herein are meant to be illustrative and do not limit the invention's scope. Although specific terms are employed herein, they are used in a generic and descriptive sense only and not for purposes of limitation. Unless otherwise defined herein, such terms are intended to be given their ordinary meaning not inconsistent with that applicable in the relevant industry and without restriction to any specific embodiment hereinafter described.

It will be understood that the steps of any such processes or methods are not limited to being carried out in any particular sequence, arrangement, or with any particular graphics or interface. In fact, the steps of the disclosed processes or methods generally may be carried out in various, different sequences and arrangements while still being in the scope of the present invention. Certain terms are used herein, such as "comprising" and "including," and similar terms are meant to be "open" and not "closed" terms. These terms should be understood as, for example, "including, but not limited to."

As previously described, there is a need for a system that converts energy from ocean waves and currents to hydrogen in an efficient, inexpensive, and clean manner. The present invention seeks to solve these and other problems.

Energy production has become an important issue for many governments over the last few decades. A lot of conversation has been had over clean energy moving forward. As such, many have turned to solar or windmills to receive necessary power. However, this type of clean energy is often ineffective and does not produce the desired results. Another source of potential energy collection is found in the ocean. The ocean covers the majority of earth and is constantly moving in the form of waves and currents. This movement is produced by wind and tide from lunar cycles. With the constant movement of the ocean, there is a lot of potential energy that could be utilized.

Some have attempted to harness the power found in the ocean, but all too often these processes and systems are expensive, thereby preventing many companies and countries from pursuing such systems. Not only are these processes and systems expensive, but many of them have a large carbon footprint and are inefficient in producing energy. Components to form these systems can be difficult to find, making them expensive. Thus, these systems may have difficulty being mass produced and available to people around the world.

The ocean wave and tidal current energy conversion system described herein may comprise numerous vessels to store compressed hydrogen and numerous cylinders that convert energy from waves and currents into hydraulic pressure so as to drive electrical generators to create hydrogen. The system takes free energy, with no carbon footprint, to produce hydrogen. The system utilizes free energy from wind (waves) and tide. Every element of wave or current movement is captured by the system, with its arrangement of vessels and cylinders. This system uses opposing forces between pitch and roll, as well as rotary forces, that are combined to absorb wave and current energy and transfer that energy in hydraulic oil under pressure. Hydraulics drive generators, and electricity produces hydrogen and runs other equipment. In particular, in some embodiments, hydraulics drives electrical generators, which provide power to electrodes in a batch tank, and a compressor to fill all the vessels with compressed hydrogen. The produced hydrogen is compressed to least 250 PSI in all the vessels.

There are many advantages to this system: no carbon footprint; byproduct is oxygen, wave energy is from wind that can be hundreds of miles seaward of this system; tidal flow is a free benefit from the moon; this system off shore, when near shore, creates a breakwater to reduce wave erosion on the shore; demand for inexpensive systems is already in effect in parts of the world, such as Australia; the oceans shorelines are around every continent, meaning this system may be used anywhere; the system can be modular, allowing multiple systems to be coupled together; each system can vary in size; and water for hydrogen will never be depleted.

As shown in FIGS. 1-6, in one embodiment, an ocean wave and tidal current energy conversion system 100 (hereinafter referred to as the "energy conversion system") comprises a first vessel 102 (e.g., pressure tank) and a second vessel 104 (e.g., pressure tank), the first vessel 102 being parallel and spaced apart from the second vessel 104. The first and second vessels 102, 104 may be cylindrically shaped and sealed on each end of the vessels 102, 104 so as to have buoyancy and receive pressurized gases. In other embodiments, the first and second vessels 102, 104 may be rectangular or any other shape. In some embodiments, the first and second vessels may be conventional propane tanks, or other types of tanks. The first and second vessels 102, 104 may be a variety of lengths and circumferences to store pressurized gases, such as hydrogen.

The first vessel 102 may comprise a first frame member 106A, a second frame member 106B, a third frame member 106C, a fourth frame member 106D, and a fifth frame member 106E, each of these members 106A-106E may be positioned on and coupled to a first upper surface 108 of the first vessel 102. The first, second, third, fourth, and fifth frame members 106A-106E may be shaped to mirror the cylindrical first vessel 102 so as to be coupleable to the first vessel 102. The opposite side of the first, second, third, fourth, and fifth frame members 106A-106E may comprise a flat surface. The first vessel 102 may also comprise a sixth frame member 106F and a seventh frame member 106G, both of which may be positioned on and coupled to a first lower surface 110 of the first vessel 102. The sixth frame member 106F may also be coupled to the second frame member 106B. The seventh frame member 106G may be coupled to the fourth frame member 106D.

The second vessel 104 may comprise an eighth frame member 106H, a ninth frame member 106I, a tenth frame member 106J, an eleventh frame member 106K, and a twelfth frame member 106L, each of these members 106H-106L may be positioned on and coupled to a second upper surface 112 of the second vessel 104. The eighth, ninth, tenth, eleventh, and twelfth frame members 106H-106L may be shaped to mirror the cylindrical second vessel 104 so as to be coupleable to the second vessel 104. The opposite side of the eighth, ninth, tenth, eleventh, and twelfth frame members 106H-106L may comprise a flat surface. The second vessel 104 may also comprise a thirteenth frame member 106M and a fourteenth frame member 106N, both of which may be positioned on and coupled to a second lower surface 114 of the second vessel 104. The thirteenth frame member 106M may also be coupled to the ninth frame member 106I. The fourteenth frame member 106N may be coupled to the eleventh frame member 106K. It will be understood that while fourteen frame members are shown that any number of members may be used, whether more or less than fourteen. The frame members 106A-106N may be manufactured out of steel, aluminum, fiberglass, carbon fiber, or any other material used in the industry.

Further, the first and second vessels 102, 104 may be positioned with a first and a second anchor 116A, 116B attached to cables or chains so as to be facing the waves or current in the pitch position (shown in FIG. 1).

Figure 2:
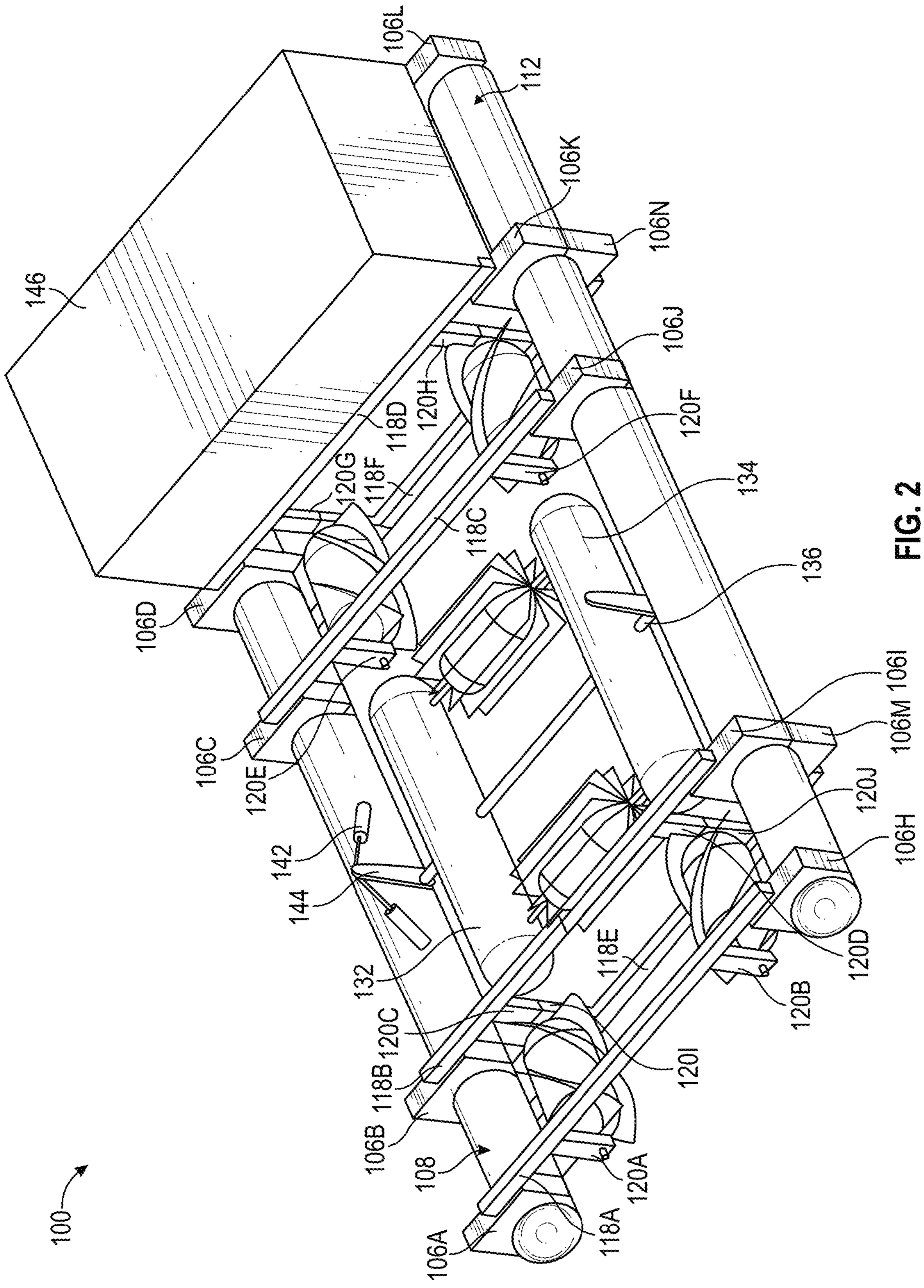
FIG. 2 illustrates a top, side perspective view of an ocean wave and tidal current energy conversion system.
Figure 3:
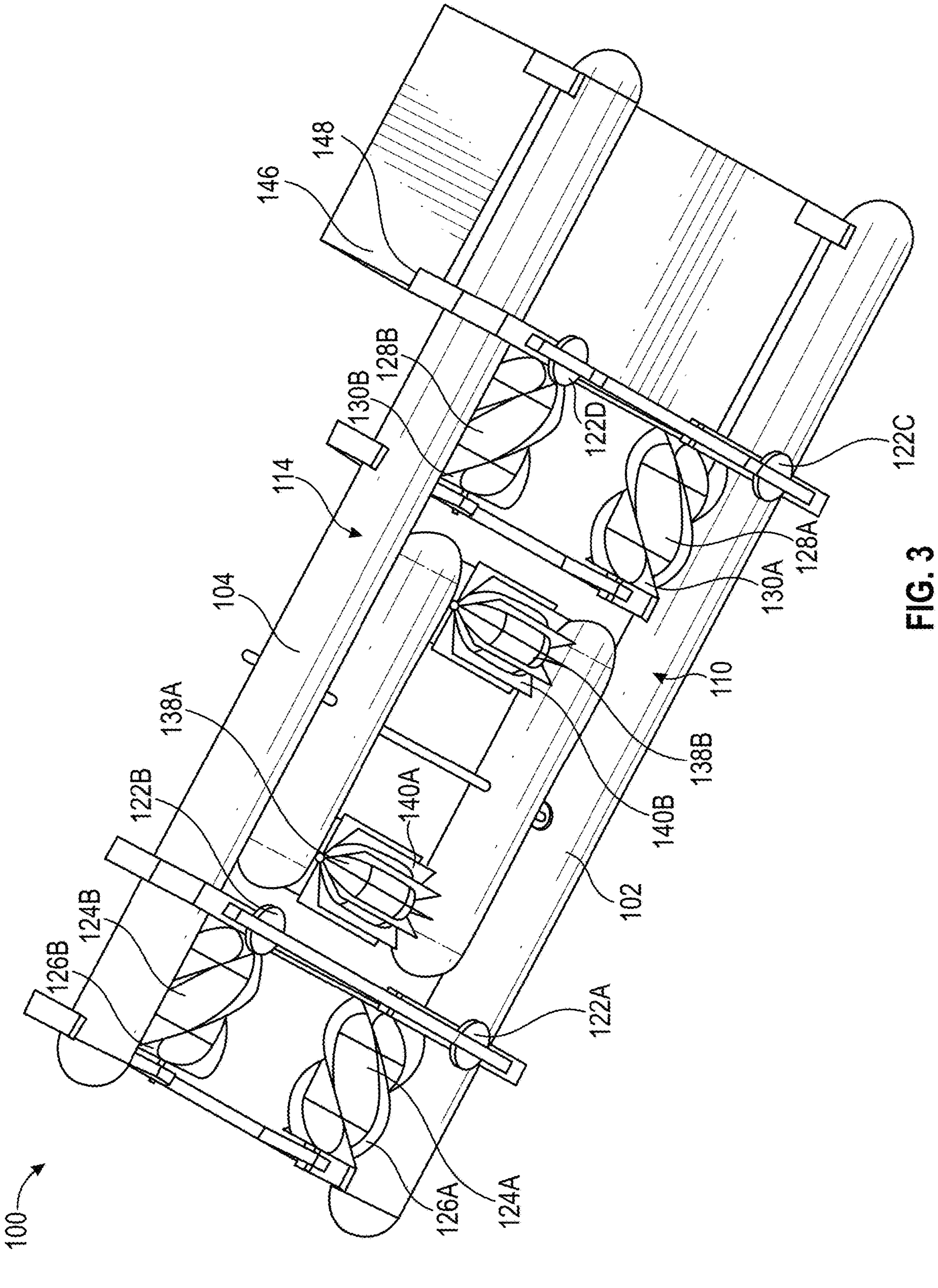
FIG. 3 illustrates a bottom perspective view of an ocean wave and tidal current energy conversion system.
Figure 4:
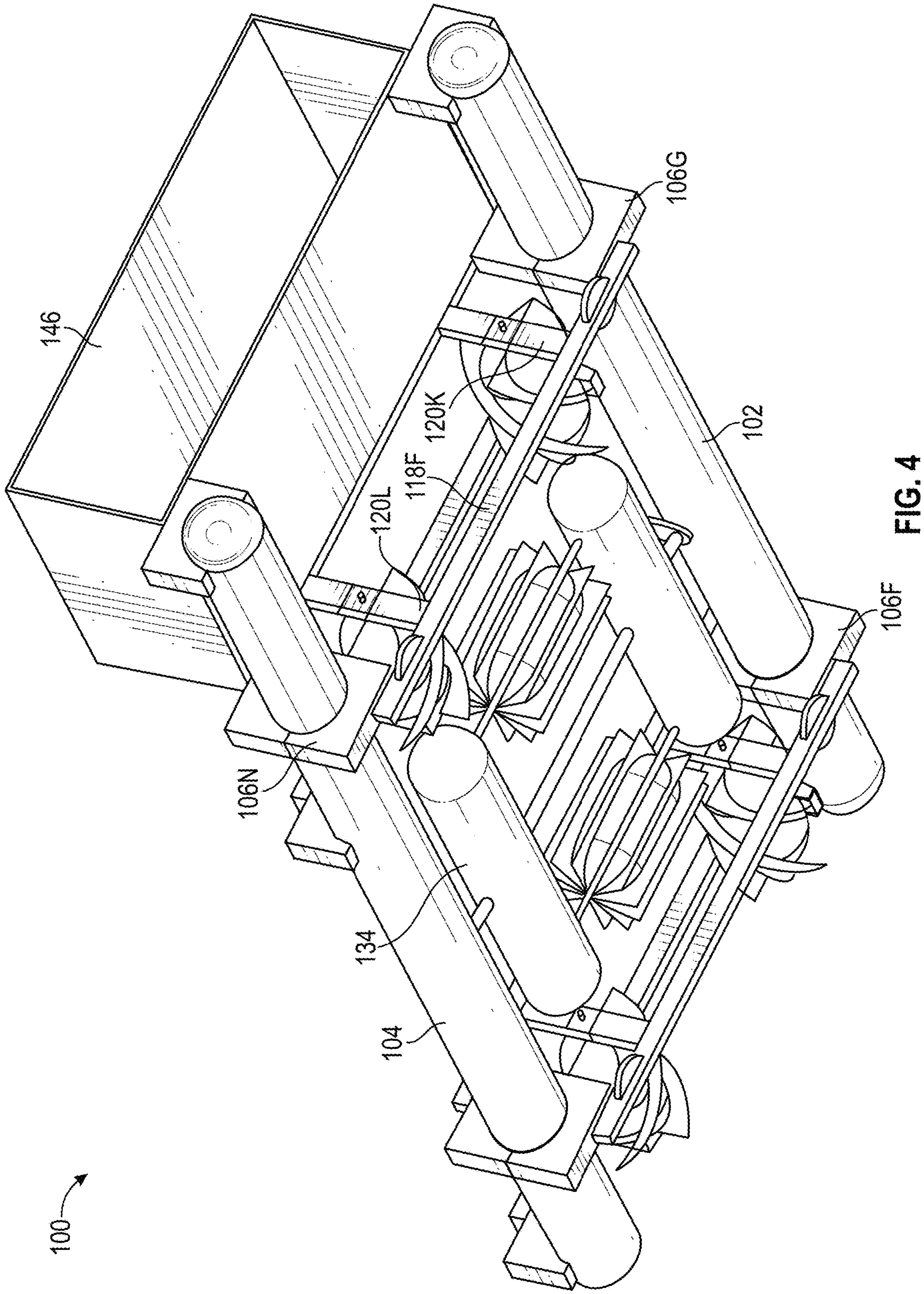
FIG. 4 illustrates a bottom, rear perspective view of an ocean wave and tidal current energy conversion system.

Referring to FIGS. 2-4, the frame members 106A-106N are positioned so as to receive supports that couple the first vessel 102 to the second vessel 104. In particular, a first support 118A with a first arm 120A and a second arm 120B may be interposed between the first and second vessels 102, 104 and coupled to the first and eighth frame members 106A, 106H. The first and second arms 120A, 120B may descend below the first support 118A. A second support 118B with a third arm 120C and a fourth arm 120D may be interposed between the first and second vessels 102, 104 and coupled to the second and ninth frame members 106B, 106I. The third and fourth arms 120C, 120D may descend below the second support 118B. A third support 118C with a fifth arm 120E and a sixth arm 120F may be interposed between the first and second vessels 102, 104 and coupled to the third and tenth frame members 106C, 106J. The fifth and sixth arms 120E, 120F may descend below the third support 118C. A fourth support 118D with a seventh arm 120G and an eighth arm 120H may be interposed between the first and second vessels 102, 104 and coupled to the fourth and eleventh frame members 106D, 106K. The seventh and eighth arms 120G, 120H may descend below the fourth support 118D. The first, second, third, and fourth supports 118A-118D may couple to the first upper surface 108 on the first vessel 102 and the second upper surface 112 on the second vessel 104. A fifth support 118E with a ninth arm 120I and tenth arm 120J may be interposed between the first and second vessels 102, 104 and coupled to the sixth and thirteenth frame members 106F, 106M. The fifth support 118E may comprise a first prop 122A and a second prop 122B, both of which may be configured to stabilize the energy conversion system when on solid ground. The first and second props 122A, 122B may be disc shaped or any other shape. The ninth and tenth arms 120I, 120J may extend upward and couple to the third and fourth arms 120C, 120D on the second support 118B. A sixth support 118F with an eleventh arm 120K and twelfth arm 120L may be interposed between the first and second vessels 102, 104 and coupled to the seventh and fourteenth frame members 106G, 106N. The sixth support 118F may comprise a third prop and a fourth prop 122C, 122D, both of which may be configured to stabilize the energy conversion system when on solid ground. The third and fourth props 122C, 122D may be disc shaped or any other shape. The eleventh and twelfth arms 120K, 120L may extend upward and couple to the seventh and eighth arms 120G, 120H on the fourth support 118D. While six supports are shown, it will be appreciated that more or less than six supports may be used.

Interposed between and perpendicular to the first and second supports 102, 104 may be a first cylinder 124A and a second cylinder 124B. The first cylinder 124A may be rotatably coupled to the first arm 120A on the first support 118A and the third arm 120C on the second support 118B and the ninth arm 120I on the fifth support 118E. The first cylinder 124A may comprise a plurality of first fins 126A which may be cork screw fins that wrap around the first cylinder 124A. The second cylinder 124B may be rotatably coupled to the second arm 120B on the first support 102 and the fourth arm 120D on the second support 102 and the tenth arm 120J on the fifth support 118E. The second cylinder 124B may comprise a plurality of second fins 126B which may be cork screw fins that wrap around the second cylinder 124B. The first and second cylinders 124A, 124B may be coupled to and interact with one or more hydraulic systems.

Interposed between and perpendicular to the third and fourth supports 118C, 118D may be a third cylinder 128A and a fourth cylinder 128B. The third cylinder 128A may be rotatably coupled to the fifth arm 120E on the third support 118C and the seventh arm 120G on the fourth support 118D and the eleventh arm 120K on the sixth support 118F. The third cylinder 128A may comprise a plurality of third fins 130A which may be cork screw fins that wrap around the third cylinder 128A. The fourth cylinder 128B may be rotatably coupled to the sixth arm 120F on the third support 118C and the eighth arm 120H on the fourth support 118D and the twelfth arm 120L on the sixth support 118F. The fourth cylinder 128B may comprise a plurality of fourth fins 130B which may be cork screw fins that wrap around the fourth cylinder 128B. The third and fourth cylinders 128A, 128B may be coupled to and interact with one or more hydraulic systems. The first, second, third, and fourth cylinders 124A, 124B, 128A, 128B may rotate with the ocean current and wave movement on axles parallel to the first and second vessels 102, 104. The first, second, third, and fourth cylinders 124A, 124B, 128A, 128B may be configured to drive rotary hydraulic pumps and contribute to the overall hydraulic energy. The vessels 102, 104 and cylinders 124A, 124B, 128A, 128B may be on the same plane.

Figure 5:
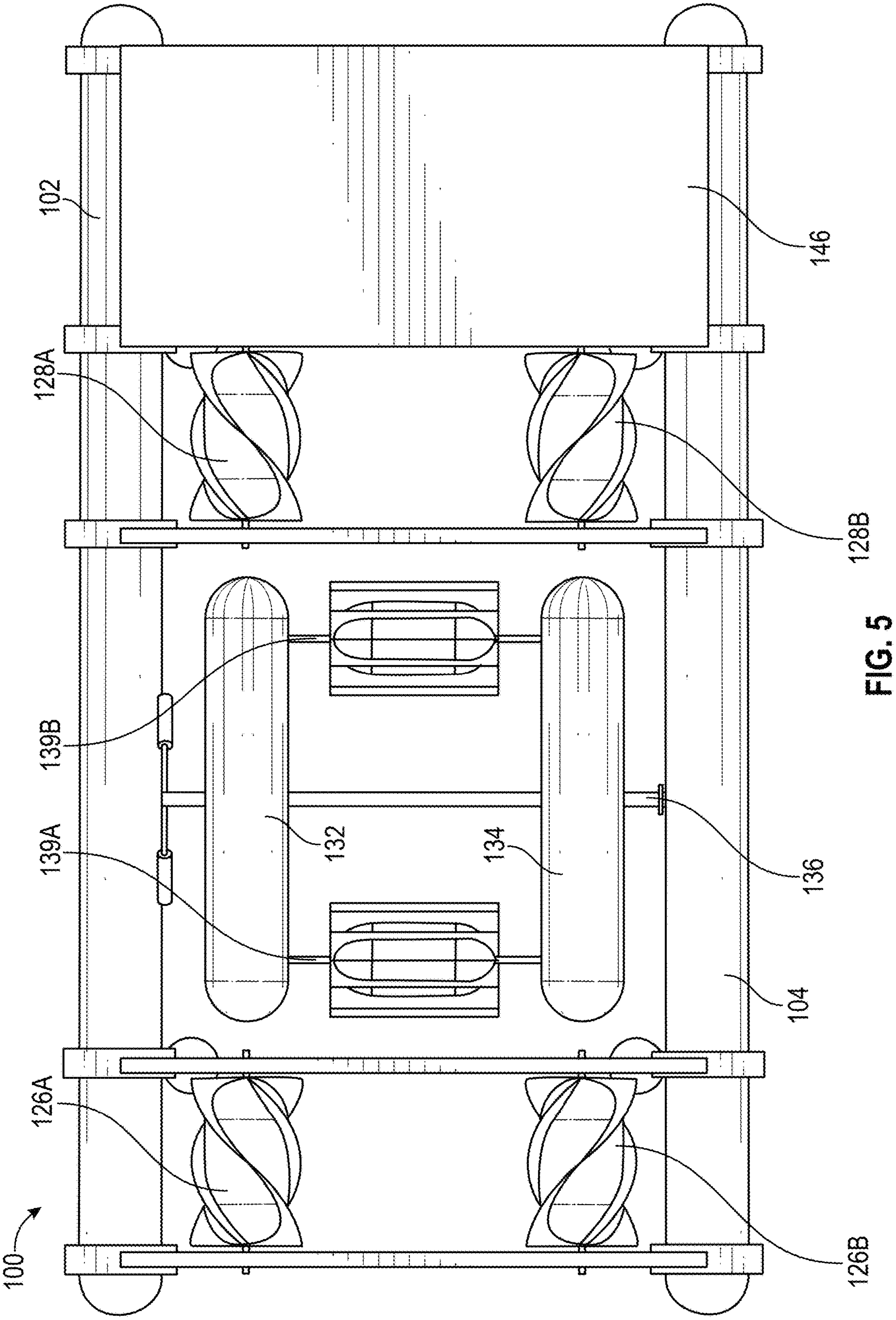
FIG. 5 illustrates a top plan view of an ocean wave and tidal current energy conversion system.
Figure 6:
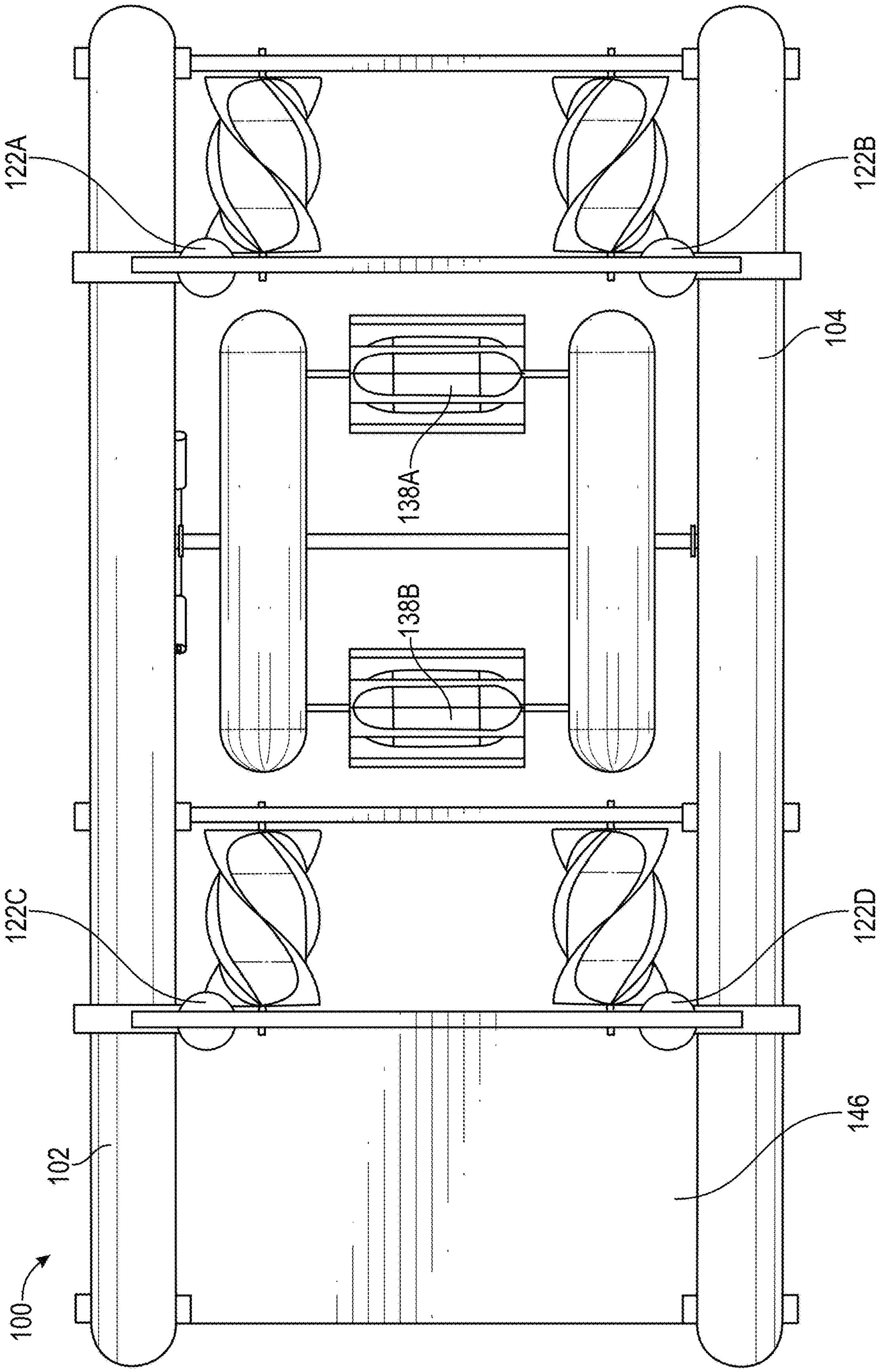
FIG. 6 illustrates a bottom plan view of an ocean wave and tidal current energy conversion system.

Further, the energy conversion system 100 may comprise a third vessel 132 and a fourth vessel 134, both of which may be shorter than the first and second vessels 102, 104. The third and fourth vessels 132, 134 may be positioned between the first and second vessels 102, 104, being parallel thereto. The third and fourth vessels 132, 134 may also be positioned between the second support and the third supports 118B, 118C. However, it could be envisioned that the third and fourth vessels 132, 134 may be positioned between other supports. The third and fourth vessels 132, 134 may be rotatably coupled to the first and second vessels 102, 104 via an axle 136. Positioned between the third and fourth vessels 132, 134 may be a fifth cylinder 138A and a sixth cylinder 138B. The fifth and sixth cylinders 138A, 138B may be rotatably coupled to the third and fourth vessels 132, 134 via second axles 139A, 139B (FIG. 5). The fifth cylinder 138A may comprise a plurality of fifth fins 140A. The sixth cylinder 138B may comprise a plurality of sixth fins 140B. The fifth and sixth cylinders 138A, 138B may be coupled to and interact with one or more hydraulic systems. The third and fourth vessels 132, 134 may have a teeter totter effect on the axle 136 due to swells on the ocean. The third and fourth vessels 132, 134 are spread apart to maximize the roll effect from average wave action. This will allow the axle 136 to rotate back and forth, which allows relative motion energy to be transferred by a bell crank on the axle 136 that creates hydraulic oil pressure via hydraulic cylinders 142 (FIG. 1), being actuated by the bell crank to a mount 144 (FIG. 1) on the first and/or second vessels 102, 104. In addition, due to the fins on the fifth and sixth cylinders 138A, 138B, the fifth and sixth cylinders 138A, 138B can rotate, which creates rotational energy that may be configured to operate a rotary hydraulic pump that would also contribute hydraulic oil flow and pressure.

The energy conversion system 100 may also comprise a housing 146 that comprises a recessed edge 148 that rests on and is secured to the fourth support 118D. An edge opposite the recessed edge may rest on and be secured to fifth and twelfth frame members 106E, 106L. The housing 146 may receive mechanical and electrical components. The housing, vessels, frame members, cylinders, supports, and any other components may have high solids epoxy primer, urethane topcoats, marine bottom paints, sacrificial zinc anodes, or some combination thereof, which will help prevent most marine growth.

Figure 7:
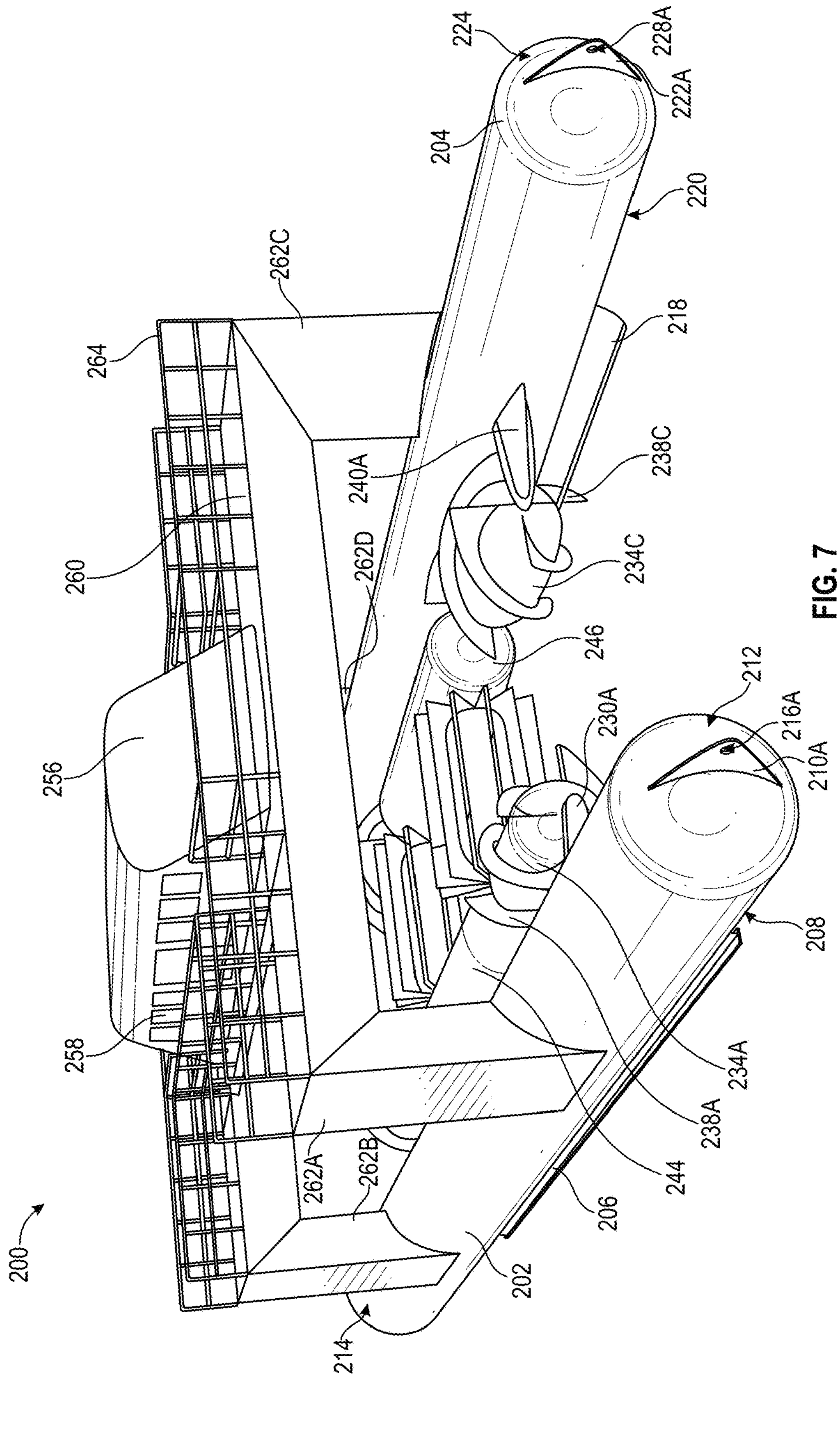
FIG. 7 illustrates a front perspective view of an ocean wave and tidal current energy conversion system.
Figure 8:
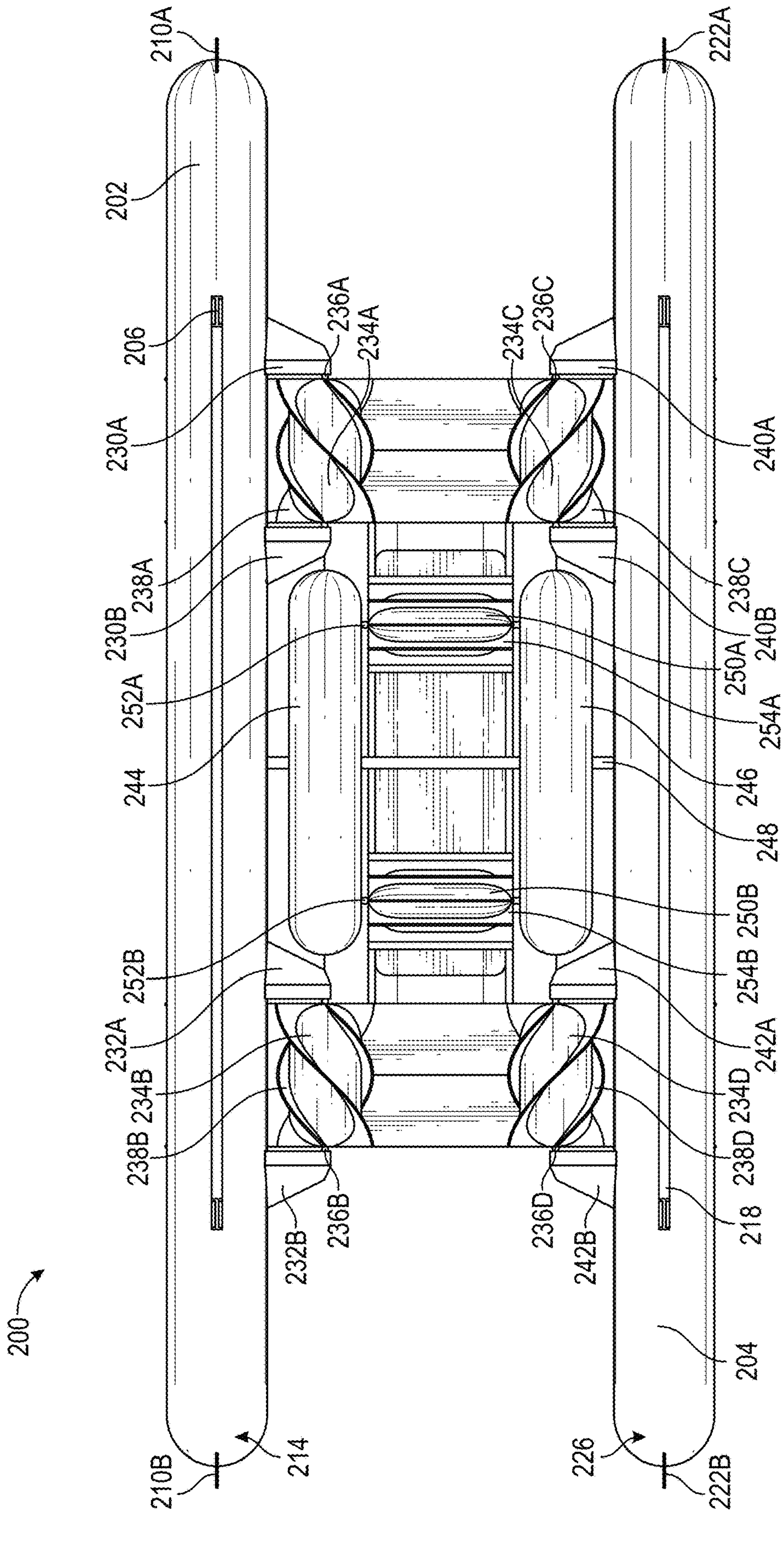
FIG. 8 illustrates a bottom plan view of an ocean wave and tidal current energy conversion system.
Figure 9:
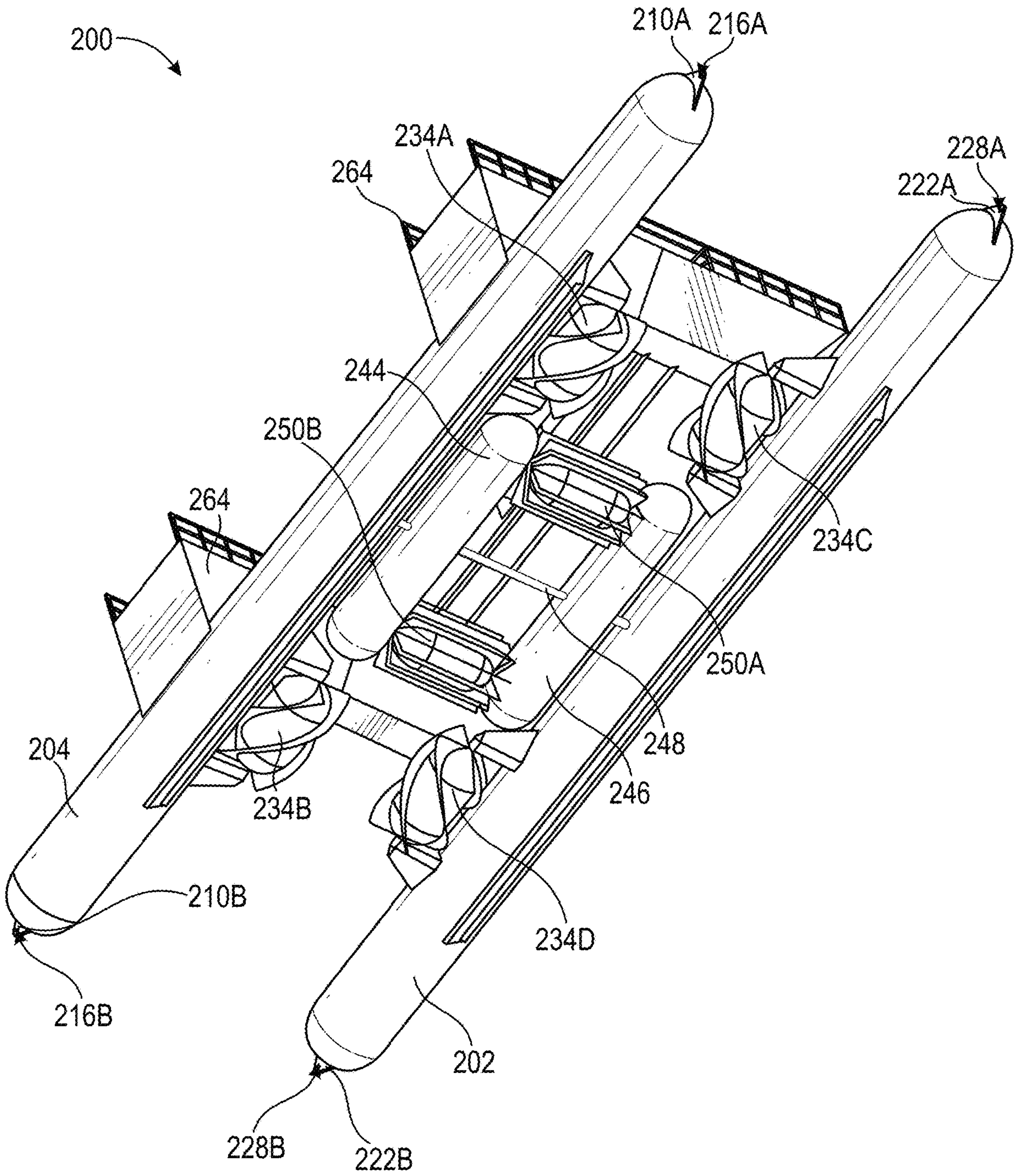
FIG. 9 illustrates a bottom perspective view of an ocean wave and tidal current energy conversion system.

As shown in FIGS. 7-9, in one embodiment, an energy conversion system 200 comprises a first vessel 202 (e.g., pressure tank) and a second vessel 204 (e.g., pressure tank), the first vessel 202 being parallel and spaced apart from the second vessel 204. The first and second vessels 202, 204 may be cylindrically shaped and sealed on each end of the vessels 202, 204 so as to have buoyancy and receive pressurized gases. In other embodiments, the first and second vessels 202, 204 may be rectangular or any other shape. In some embodiments, the first and second vessels 202, 204 may be conventional propane tanks, or other types of tanks. The first and second vessels 202, 204 may be a variety of lengths and circumferences to store pressurized gases, such as hydrogen.

The first vessel 202 may comprise a first vessel fin 206 fastened on a first lower surface 208. The first vessel fin 206 may be fastened to the first lower surface 208 via welding or other fastening mechanisms. The first vessel fin 206 may extend downward away from the first vessel 202. The first vessel 202 may also comprise a first member 210A and a second member 210B coupled to a first end 212 and a second end 214, respectively. The first member 210A may comprise a first aperture 216A and the second member 210B may comprise a second aperture 216B. The first and second members 210A, 210B may be generally triangular shaped; however, other shapes may be used such as circular or rectangular members. The first and second members 210A, 210B may also be flat, or in some embodiments, include more of a three-dimensional configuration.

Similarly, the second vessel 204 may comprise a second vessel fin 218 fastened on a second lower surface 220. The second vessel fin 218 may be fastened to the second lower surface 220 via welding or other fastening mechanisms. The second vessel fin 218 may extend downward away from the second vessel 204. The second vessel 204 may also comprise a third member 222A and a fourth member 222B coupled to a third end 224 and a fourth end 226, respectively. The third member 222A may comprise a third aperture 228A and the fourth member 222B may comprise a fourth aperture 228B. The third and fourth members 222A, 222B may be generally triangular shaped; however, other shapes may be used such as circular or rectangular members. The third and fourth members 222A, 222B may also be flat, or in some embodiments, include more of a three-dimensional configuration. It will be understood that the first and second vessel fins 206, 218 provide stability to the energy conversion system 200. The first, second, third, and fourth members 210A, 210B, 222A, 222B allow the anchoring systems (e.g., metal cables and attachments) to be attached thereto so as to secure the energy conversion system 200 in place. As such, the first and second vessels 202, 204 may be positioned with a one or more anchors so as to be facing the waves or current in the pitch position (similar to those shown in FIG. 1).

The first vessel 202 may comprise a first support 230A and a second support 230B and a third support 232A and a fourth support 232B. The first and second supports 230A, 230B protrude from an inner side of the first vessel 202. Interposed between the first and second supports 230A, 230B may be a first cylinder 234A that may be sealed. The first cylinder 234A may be rotatably coupled to the first and second supports 230A, 230B via a first axle 236A. The first cylinder 234A may comprise a plurality of first fins 238A which, in some embodiments, may be cork screw fins that wrap around the first cylinder 234A.

The third support 232A and the fourth support 232B also protrude from the inner side of the first vessel 202. Interposed between the third and fourth supports 232A, 232B may be a second cylinder 234B that may be sealed. The second cylinder 234B may be rotatably coupled to the third and fourth supports 232A, 232B via a second axle 236B. The second cylinder 234B may comprise a plurality of second fins 238B which, in some embodiments, may be cork screw fins that wrap around the second cylinder 234B.

The second vessel 204 may comprise a fifth support 240A and a sixth support 240B and a seventh support 242A and an eighth support 242B. The fifth and sixth supports 240A, 240B protrude from an inner side of the second vessel 204. Interposed between the fifth and sixth supports 240A, 240B may be a third cylinder 234C that may be sealed. The third cylinder 234C may be rotatably coupled to the fifth and sixth supports 240A, 240B via a third axle 236C. The third cylinder 234C may comprise a plurality of third fins 238C which, in some embodiments, may be cork screw fins that wrap around the third cylinder 234C.

The seventh support 242A and the eighth support 242B also protrude from the inner side of the second vessel 204. Interposed between the seventh and eighth supports 242A, 242B may be a fourth cylinder 234D that may be sealed. The fourth cylinder 234D may be rotatably coupled to the seventh and eighth supports 242A, 242B via a fourth axle 236D. The fourth cylinder 234D may comprise a plurality of fourth fins 238D which, in some embodiments, may be corkscrew-shaped fins that wrap around the fourth cylinder 234D.

The first, second, third, and fourth cylinders 234A, 234B, 234C, 234D may rotate with the ocean current and wave movement on axles parallel to the first and second vessels 202, 204. The first, second, third, and fourth cylinders 234A, 234B, 234C, 234D may be configured to drive rotary hydraulic pumps and contribute to the overall hydraulic energy. The vessels 202, 204 and cylinders 234A, 234B, 234C, 234D may be on the same plane.

Further, the energy conversion system 200 may comprise a third vessel 244 and a fourth vessel 246, both of which may be shorter than the first and second vessels 202, 204. The third and fourth vessels 244, 246 may be positioned between the first and second vessels 202, 204, being parallel thereto. The third and fourth vessels 244, 246 may also be positioned between the first and second cylinders 234A, 234B and the third and fourth cylinders 234C, 234D. However, it could be envisioned that the third and fourth vessels 244, 246 may be positioned between other components of the energy conversion system 200. The third and fourth vessels 244, 246 may be rotatably coupled to the first and second vessels 202, 204 via an axle 248. Positioned between the third and fourth vessels 244, 246 may be a fifth cylinder 250A at one end and a sixth cylinder 250B and an end opposite the fifth cylinder 250A. The fifth and sixth cylinders 250A, 250B may be rotatably coupled to the third and fourth vessels 244, 246 via vessel axles 252A, 252B (FIG. 8). The fifth cylinder 250A may comprise a plurality of fifth fins 254A. The sixth cylinder 250B may comprise a plurality of sixth fins 254B. The plurality of fifth and six fins 254A, 254B may be generally rectangular-shaped fins and run lengthwise on the fifth and sixth cylinders 250A, 250B. The fifth and sixth cylinders 250A, 250B may be coupled to and interact with one or more hydraulic systems. The third and fourth vessels 244, 246 may have a teeter totter effect on the axle 248 due to swells on the ocean. The third and fourth vessels 244, 246 are spread apart to maximize the roll effect from average wave action. This will allow the axle 248 to rotate back and forth, which allows relative motion energy to be transferred by a bell crank on the axle 248 that creates hydraulic oil pressure via hydraulic cylinders (similar to those shown in FIG. 1), being actuated by the bell crank to a mount on the first and/or second vessels. In addition, due to the fins on the fifth and sixth cylinders 250A, 250B, the fifth and sixth cylinders 250A, 250B can rotate, which creates rotational energy that may be configured to operate a rotary hydraulic pump that would also contribute hydraulic oil flow and pressure.

The energy conversion system 200 may also comprise a cabin 256 that may include one or more windows 258 that rests on a platform 260. The platform 260 may comprise a first leg 262A, a second leg 262B, a third leg 262C, and a fourth leg 262D. The first leg and second leg 262A, 262B may be coupled to the first vessel 202. The third leg and fourth leg 262C, 262D may be coupled to the second vessel 204. The platform 260 may extend between the first and second vessels 202, 204. Further, an upper surface of the platform 260 may comprise guardrails 264. The cabin 256 may include mechanical and electrical components, sleeping quarters, etc. The housing, vessels, frame members, cylinders, supports, and any other components may have high solids epoxy primer, urethane topcoats, marine bottom paints, sacrificial zinc anodes, or some combination thereof, which will help prevent most marine growth. It will be appreciated that the energy conversion system 200 may be coupled to other energy conversion systems to create a breakwater (shown in FIG. 10).

Figure 11:
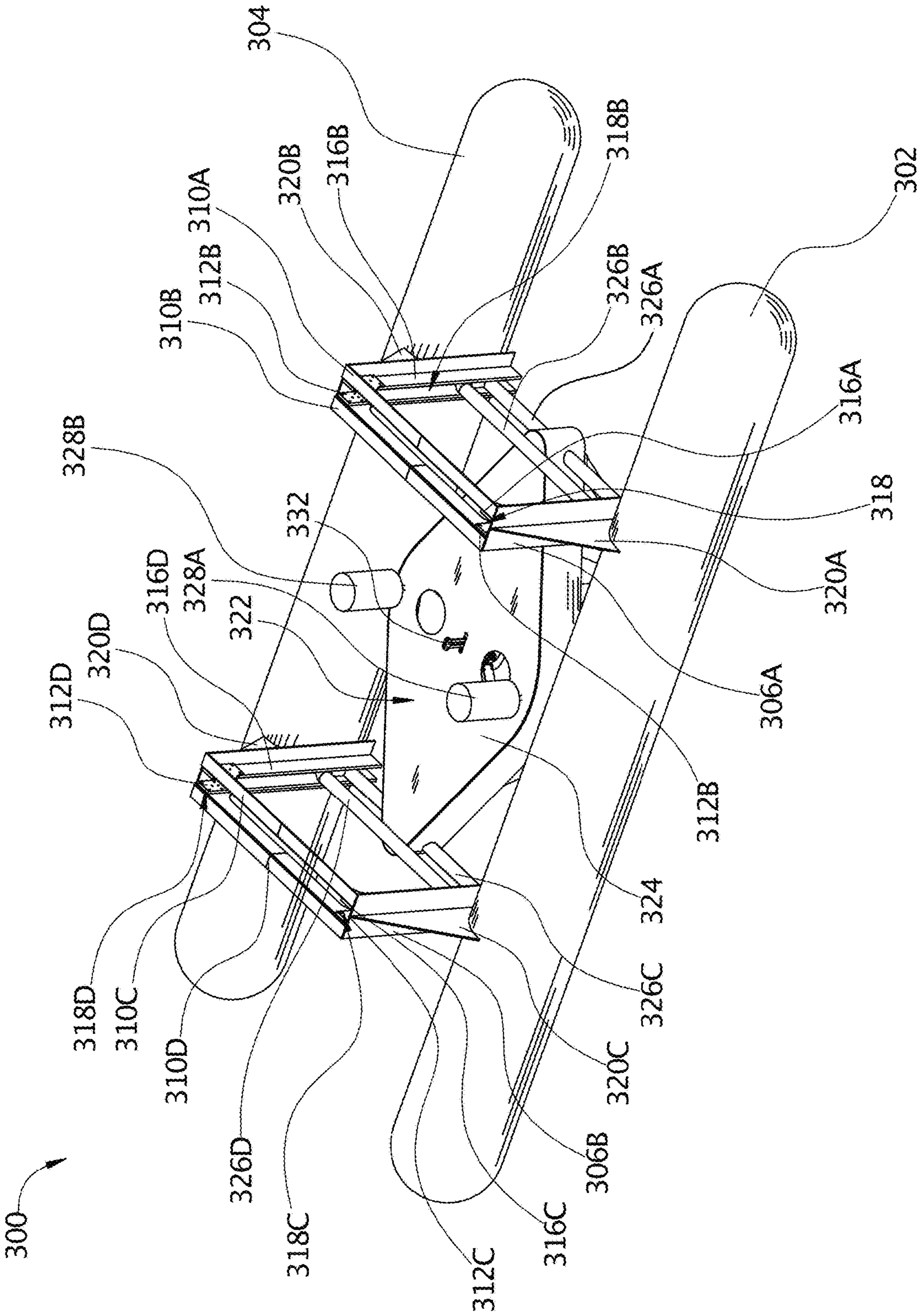
FIG. 11 illustrates a top, side perspective view of an ocean wave and tidal current energy conversion system.
Figure 12:
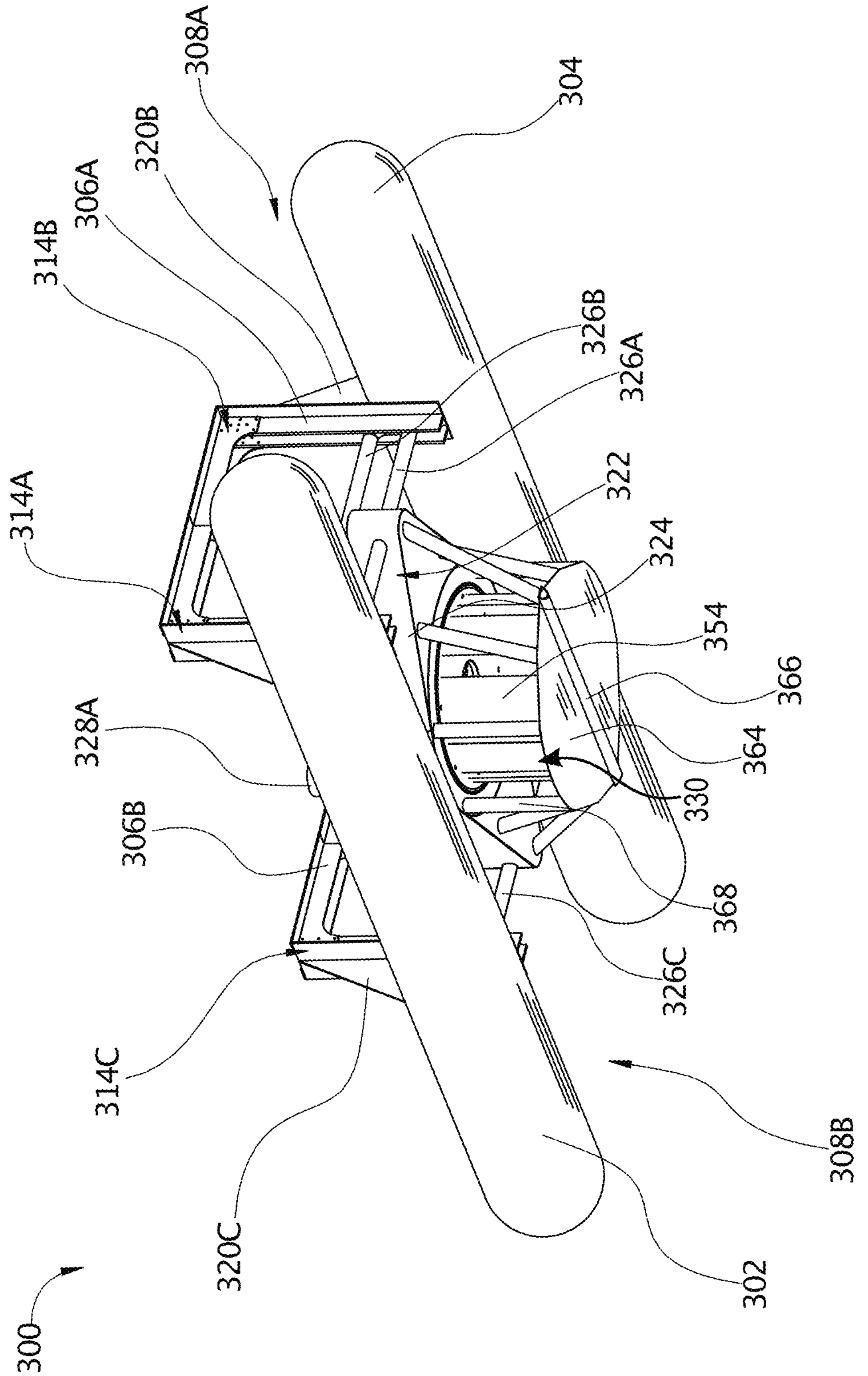
FIG. 12 illustrates a side, bottom perspective view of an ocean wave and tidal current energy conversion system.
Figure 13:
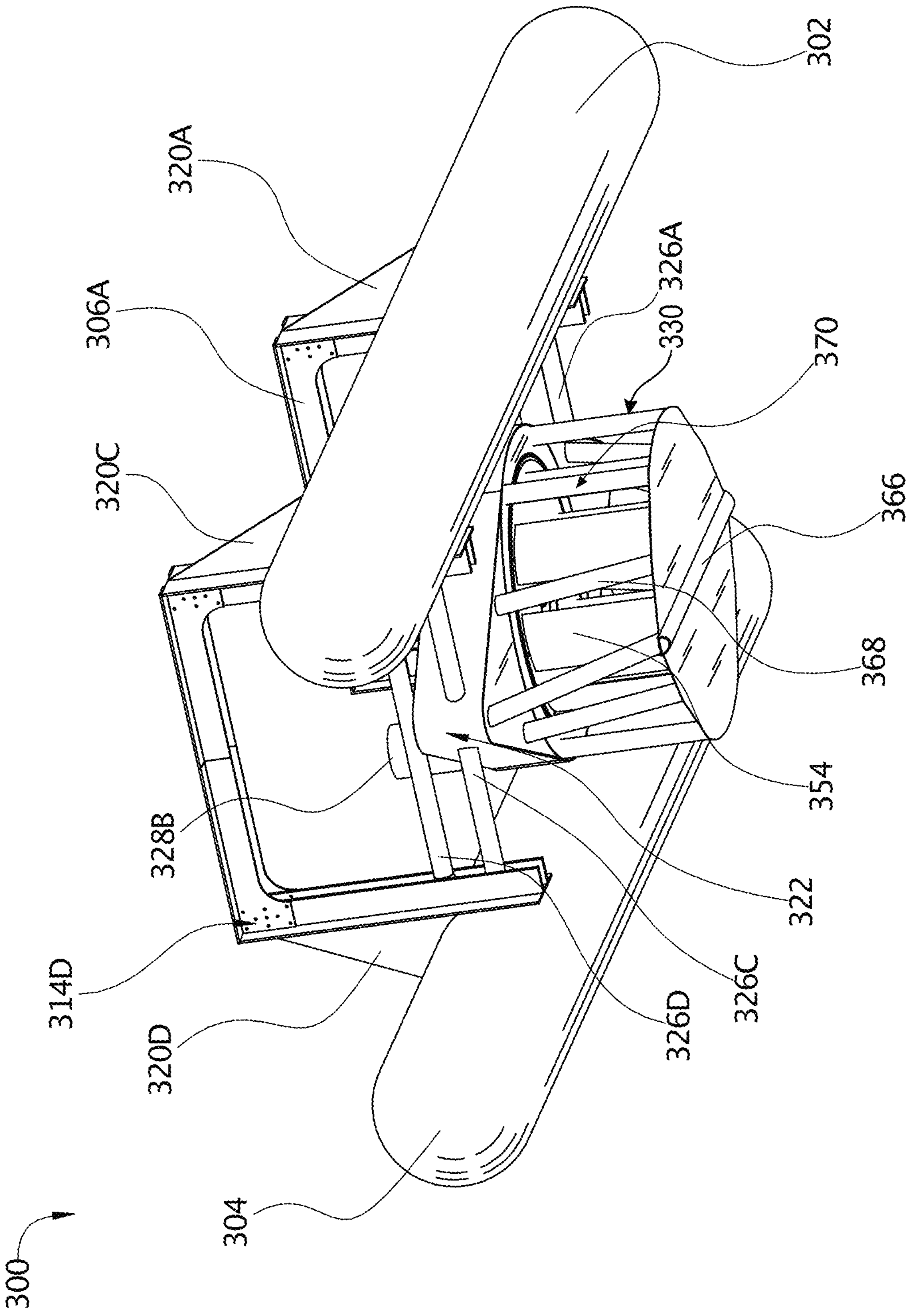
FIG. 13 illustrates a rear, bottom perspective view of an ocean wave and tidal current energy conversion system.

In one embodiment, as illustrated in FIGS. 11-13, an energy conversion system 300 comprises a first vessel 302 (e.g., pressure tank) and a second vessel 304 (e.g., pressure tank), the first vessel 302 being parallel and spaced apart from the second vessel 304. The first and second vessels 302, 304 may be cylindrically shaped and sealed on each end of the vessels 302, 304 so as to have buoyancy and receive pressurized gases. In other embodiments, the first and second vessels 302, 304 may be rectangular or any other shape. In some embodiments, the first and second vessels 302, 304 may be conventional propane tanks, or other types of tanks. The first and second vessels 302, 304 may be a variety of lengths and circumferences to store pressurized gases, such as hydrogen.

A first support 306A may be positioned at a first end 308A of the first and second vessels 302, 304. The first support 306A may include a first frame 310A and a second frame 310B. The first and second frames 310A, 310B may be coupled together with one or more first brackets 312A, 312B. In some embodiments, the first and second frames 310A, 310B may be coupled together via welding or any other fastening mechanism. The one or more first brackets 312A, 312B may interact with and be positioned on an inner surface of the first support 306A at a first upper side 314A (FIG. 12) and a second upper side 314B (FIG. 12). The one or more first brackets 312A, 312B may also interact with a first channel member 316A and a second channel member 316B, both of which are coupled to the first support 306A. The first and second channel members 316A, 316B may be u-shaped so as to create a first channel 318A in the first channel member 316A and a second channel 318B in the second channel member 316B. The first support 306A may have a first vessel support 320A on one side and a second vessel support 320B on a side opposite the first vessel support 320A. The first vessel support 320A may rest upon and be coupled to an upper surface of the first vessel 302. The second vessel support 320B may rest upon and be coupled to an upper surface of the second vessel 304. The first support 306A may be perpendicular to and interposed between the first and second vessels 302, 304.

A second support 306B may be positioned at a second end 308B of the first and second vessels 302, 304. The second support 306B may include a third frame 310C and a fourth frame 310B. The third and fourth frames 310C, 310D may be coupled together with one or more second brackets 312C, 312D. In some embodiments, the third and fourth frames 310C, 310D may be coupled together via welding or any other fastening mechanism. The one or more second brackets 312C, 312D may interact with and be positioned on an inner surface of the second support 306B at a third upper side 314C and a fourth upper side 314D. The one or more second brackets 312A, 312B may also interact with a third channel member 316C and a fourth channel member 316D, both of which are coupled to the second support 306B. The third and fourth channel members 316C, 316D may be u-shaped so as to create a third channel 318C in the third channel member 316C and a fourth channel 318D in the fourth channel member 316D. The second support 306B may have a third vessel support 320C on one side and a fourth vessel support 320D on a side opposite the third vessel support 320C. The third vessel support 320C may rest upon and be coupled to an upper surface of the first vessel 302. The fourth vessel support 320D may rest upon and be coupled to an upper surface of the second vessel 304. The second support 306B may be perpendicular to and interposed between the first and second vessels 302, 304.

Positioned between and coupled to the first and second supports 306A, 306B is a turbine 322 (e.g., a vertical axis turbine). The turbine 322 may comprise a housing 324 that may be coupled to a first rod 326A and interacts with a second rod 326B at one end of the housing 324. The first rod 326A and second rod 326B may be positioned in the first and second channels 318A, 318B, being adjustably secured to the first and second channel members 316A, 316B. That is, the first and second rods 326A, 326B may be adjusted in height along the first and second channels 318A, 318B, thereby allowing the turbine 322 to move. The first rod 326A may pass through the housing 324 while the second rod 326B rests upon an upper surface of the housing 324. Further, the housing 324 may be coupled to a third rod 326C and interact with a fourth rod 326D at an end of the housing 324 opposite insertion of the first rod 326A. The third rod 326C and fourth rod 326D may be positioned in the third and fourth channels 318C, 318D, being adjustably secured to the third and fourth channel members 316C, 316D. That is, the third and fourth rods 326C, 326D may be adjusted in height along third and fourth channels 318C, 318D, thereby allowing the turbine 322 to move. The third rod 326C may pass through the housing 324 while the fourth rod 326C rests upon an upper surface of the housing 324. It will be appreciated that the turbine 322 may be moved up and down via cables and winches or by any other mechanisms. Referring to FIG. 11, the upper surface of the housing 324 may comprise a first cylinder 328A (e.g., generators or hydraulic pumps) and a second cylinder 328B (e.g., generators or hydraulic cylinders). While two cylinders are shown, it will be appreciated that any number of cylinders may be used, such as one or three.

Figure 14:
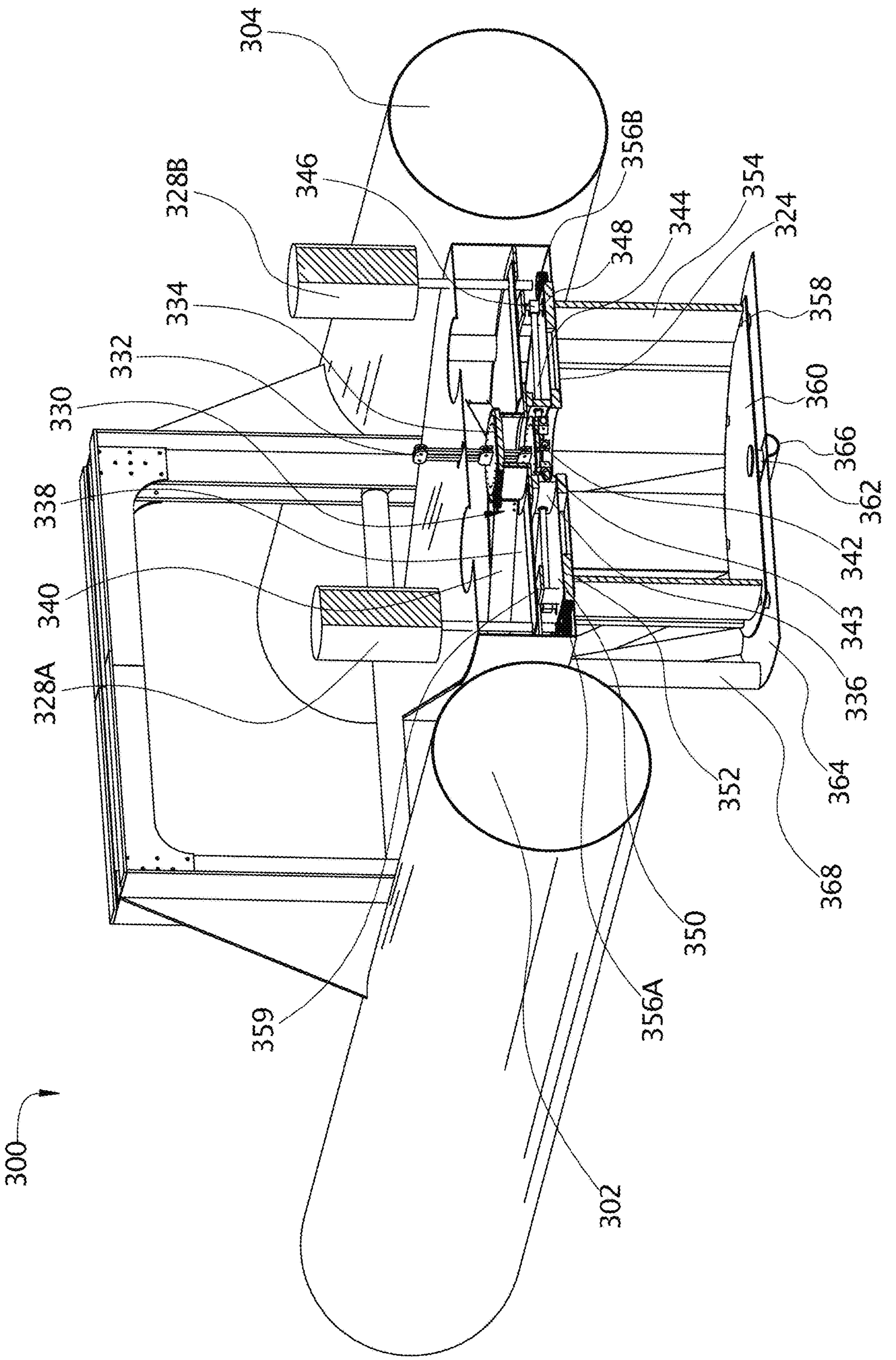
FIG. 14 illustrates a cross-sectional view of a turbine of an ocean wave and tidal current energy conversion system.

As shown in FIGS. 12-16, the housing 324 may include a rotating portion 330 of the housing 324. The rotating portion 330 is capable of rotating 360 degrees. Referring to FIG. 14, the rotating portion 330 may comprise a bearing and a controller 332, such as a cyclic controller. The controller 332 may pass through the top of the housing 324 and through a second housing 334. The second housing 334, on an outer edge, may have gear teeth to interact with a gear to promote rotation. Positioned below and coupled to a lower surface of the second housing 334, may be a third housing 336. A first plate 338 may rest on an upper surface of the third housing 336 and extend to an inner wall of the housing 324. On an upper surface of the first plate 338, support wings 340 may extend from an outer surface of the second housing 334 to the inner surface of the housing 324. The third housing 336 may be open to, or is accessible through, the bottom of the second housing 334. As such, the controller 332 may descend through the second housing 334 and into the third housing 336, where the controller 332 couples to a second plate 342 (e.g., a swashplate). The second plate 342 can be adjusted in rotation to adapt to the inflow direction as well as move in all directions by means of the controller 332 to control the rotational speed and torque. The second plate 342 may be configured to interact with and be secured to first rods 344 on a lower surface of the second plate 342 via first fasteners 343 that protrude through the third housing 336 to second fasteners 346, where one or more second rods 348 may also couple to the second fasteners 346. The one or more second rods 348 may be perpendicular to the first rods 344 and pass through a third plate 350, a fourth plate 352, and the housing 324 to blades 354 (e.g., vertical airfoil shaped blades), the blades 354 being located underneath the housing. The blades 354 are on a rotating vertical axis where the pitch of each blade 354 is controlled by the controller 332. The controller 332 adjusts each blade 354 for the maximum take-off power of the passing ocean or river current. In some embodiments, there may be two or more blades. The fourth plate 352 may comprise gear teeth that interact with a first gear 356A and a second gear 356B, which are configured to rotate the rotating portion 330. The blades 354 may couple to axles 358 (e.g., pivot axles). The pivot axles 358, at an upper end, may couple to a ring 359 that is interposed between the first plate 338 and third plate 350. In addition, the pivot axles 358 may pass through the length of the blades 354 and couple to a fifth plate 360. The fifth plate 360 may comprise a turbine axle 362 that couples to a bottom plate 364. The bottom plate 364 may include a fin 366 on its lower surface. The bottom plate 364 may be coupled to a lower surface of the housing 324 via a plurality of support arms 368, thereby creating a cage 370 (e.g., FIG. 13) to protect the blades 354. The cage 370 and housing 324 may each be V-shaped at both ends so as, in some embodiments, to act as an ice breaker bow to deal with break-up ice moving in and out of an inlet.

It will be appreciated that there may be two centers of rotation. In the first center of rotation, each blade 354 has the pivot axle 358 which follows a fixed circular path. In the second center of rotation, the rotating portion 330 varies in rotation depending on the position of the cyclic control 332, and the first rods 344 extend from the second plate 342 (e.g., cyclic swashplate) to a position on each blade 354 proximate the pivot axle 358. In addition, in some embodiments, the second plate 342, which controls the blade pitch, may be a shape other than circular. For example, the second plate 342 may be shaped to minimize drag of an advancing blade, then quickly change pitch so the retreating blade captures the greatest force from the direction of the water flow.

Figure 15:
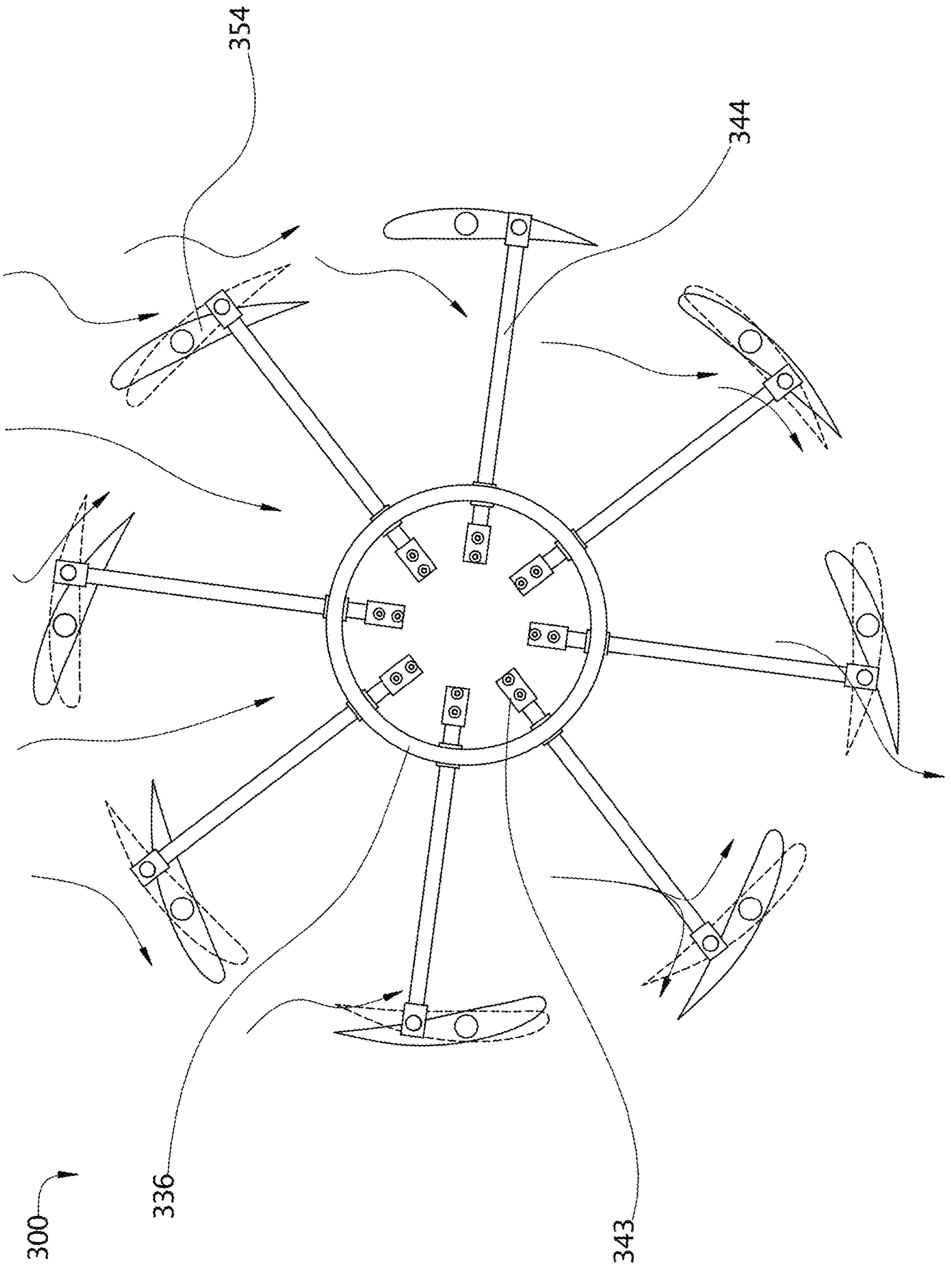
FIG. 15 illustrates a top plan view of a turbine of an ocean wave and tidal current energy conversion system.

Referring to FIG. 15, the blades 354 may adjust to water current via both the pivot axles 358 and the first and second rods 344, 348, which are controlled by the controller 332. Due to these adjustments, the system 300 is capable of capturing maximum energy.

Figure 16:
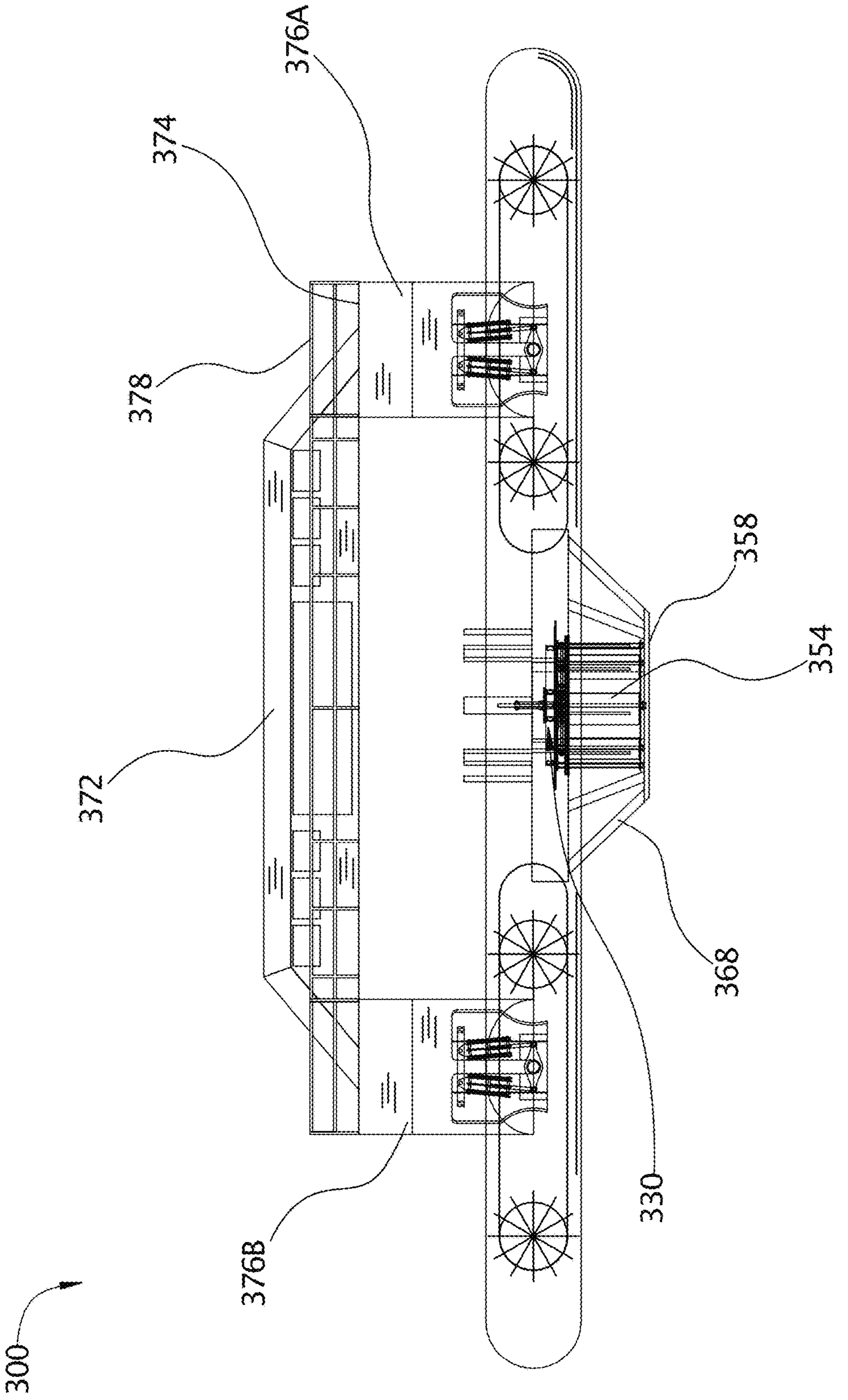
FIG. 16 illustrates a side elevation view of an ocean wave and tidal current energy conversion system.

As shown in FIG. 16, the energy conversion system 300, in some embodiments, may include a cabin 372 that may include one or more windows that rests on a platform 374. The platform 374 may comprise a first leg 376A, a second leg 376B, a third leg (not shown), and a fourth leg (not shown). The first and second legs 376A, 376B may be coupled to the first vessel 302. The third and fourth legs may be coupled to the second vessel 304. The platform 374 may extend between the first and second vessels 302, 304. Further, an upper surface of the platform 374 may comprise guardrails 378. The cabin 372 may include mechanical and electrical components, sleeping quarters, etc. The housing, vessels, frame members, cylinders, supports, and any other components may have high solids epoxy primer, urethane topcoats, marine bottom paints, sacrificial zinc anodes, or some combination thereof, which will help prevent most marine growth.

Figure 17:
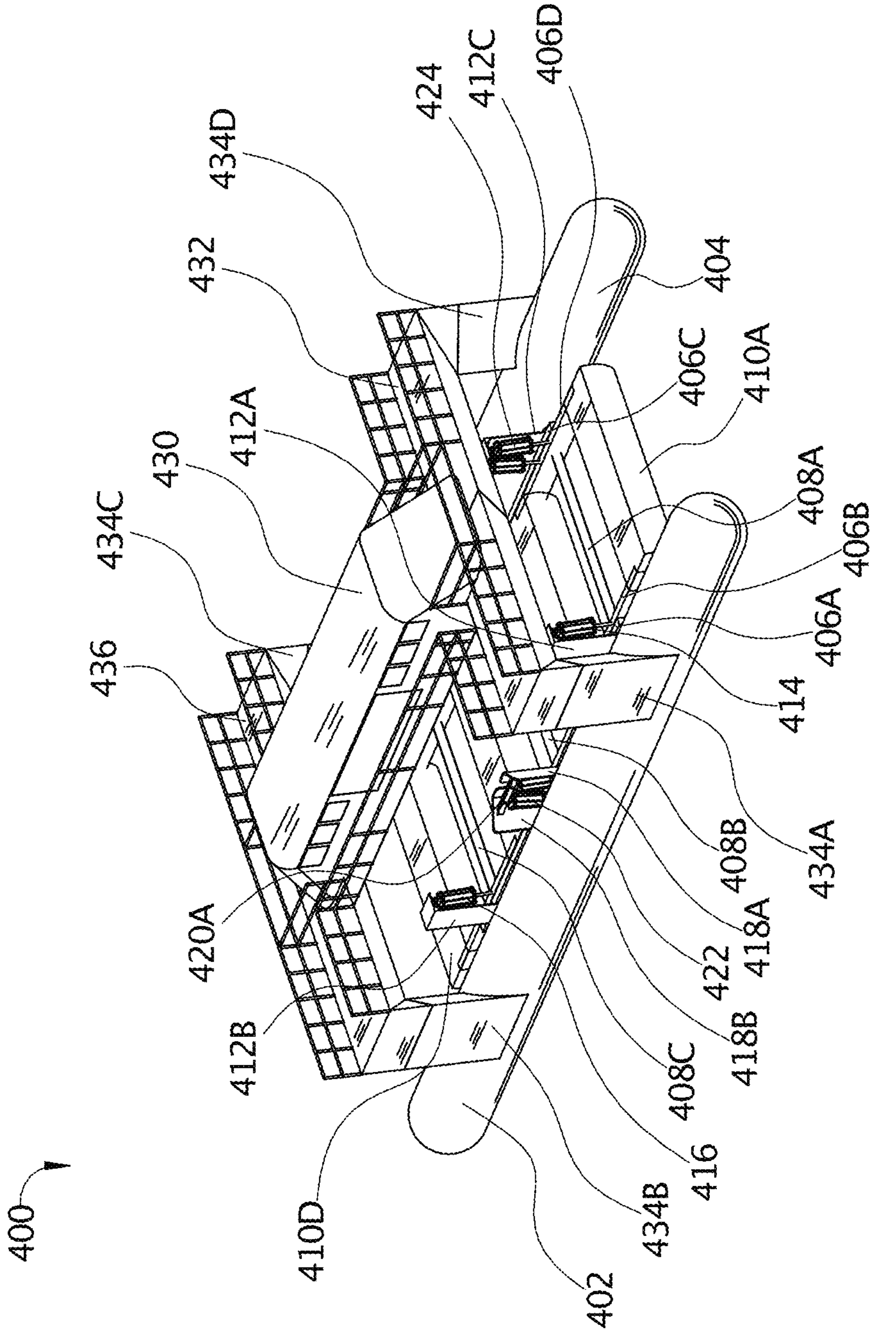
FIG. 17 illustrates a top, side perspective view of an ocean wave and tidal current energy conversion system.
Figure 18:
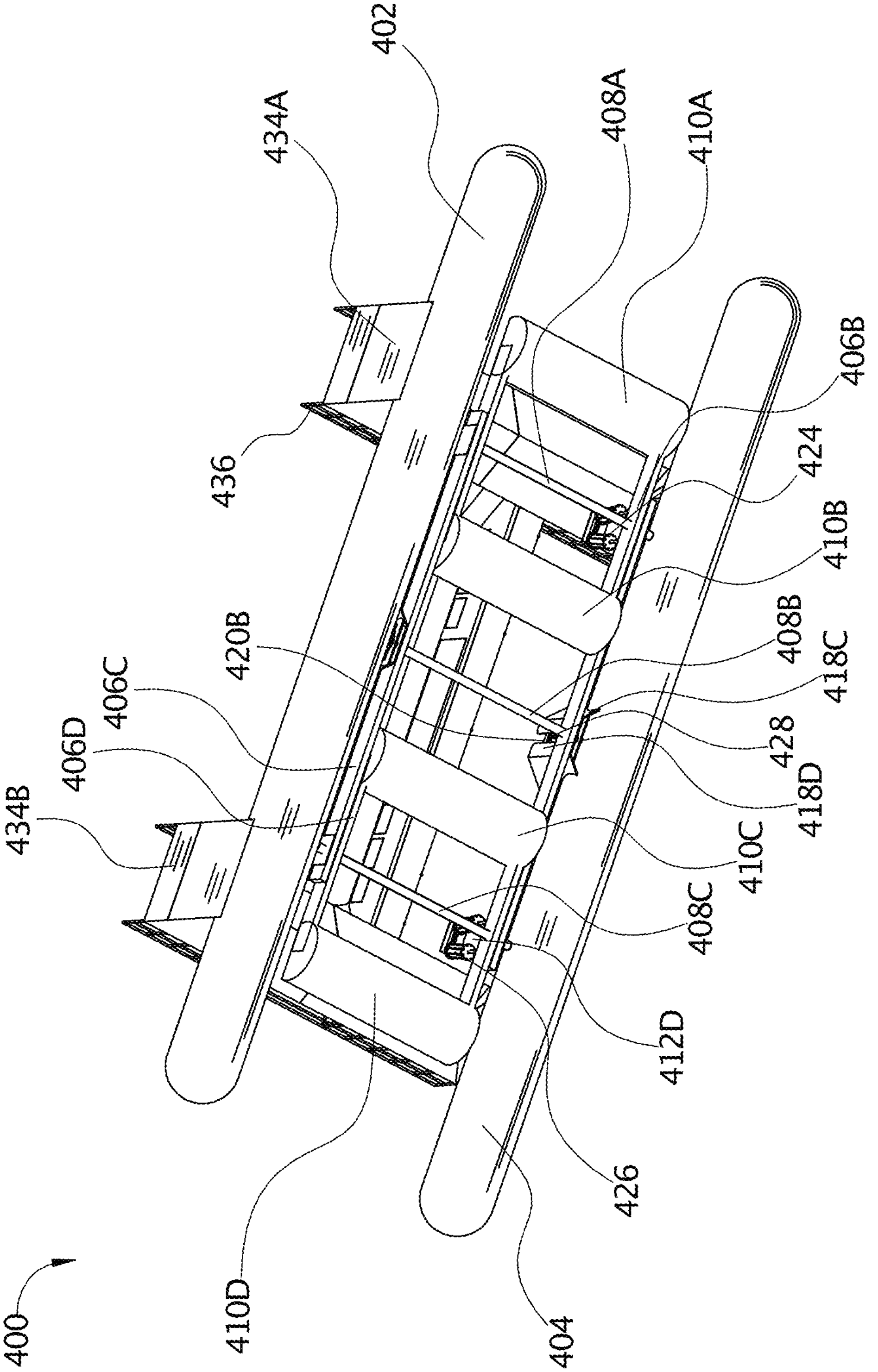
FIG. 18 illustrates a bottom perspective view of an ocean wave and tidal current energy conversion system.

As shown in FIGS. 17-18, in one embodiment, an energy conversion system 400 comprises a first vessel 402 (e.g., pressure tank) and a second vessel 404 (e.g., pressure tank), the first vessel 402 being parallel and spaced apart from the second vessel 404. The first and second vessels 402, 404 may be cylindrically shaped and sealed on each end of the vessels 402, 404 so as to have buoyancy and receive pressurized gases. In other embodiments, the first and second vessels 402, 404 may be rectangular or any other shape. In some embodiments, the first and second vessels 402, 404 may be conventional propane tanks, or other types of tanks. The first and second vessels 402, 404 may be a variety of lengths and circumferences to store pressurized gases, such as hydrogen.

Proximate the first vessel 402, there may be a first support 406A and a second support 406B. The first support 406A may be nearest the first vessel 402 and be generally rectangular-shaped. The first support 406A may be parallel to the first vessel 402. The second support 406B may be removably attachable to the first support 406A. The second support 406B may be longer than the first support 406A. The second support 406B may be positioned nearer the second vessel 404 than the first support 406A. The second support 406B may be generally rectangular in shape. The first and second supports 406A, 406B may both be shorter in length than the first and second vessels 402, 404. Proximate the second vessel 404, there may be a third support 406C and a fourth support 406D. The third support 406C may be nearest the second vessel 404 and be generally rectangular-shaped. The third support 406C may be parallel to the second vessel 404. The fourth support 406D may be removably attachable to the third support 406C. The fourth support 406D may be longer than the third support 406C. The fourth support 406D may be positioned nearer the first vessel 402 than the third support 406C. The fourth support 406D may be generally rectangular in shape. The third and fourth supports 406C, 406D may both be shorter in length than the first and second vessels 402, 404.

The first, second, third, and fourth supports 406A-406D may couple to the first and second vessels via a first axle 408A, a second axle 408B, and a third axle 408C. The axles 408A-408C may pass through the first, second, third, and fourth supports 406A-406D and couple to the first and second vessels 402, 404, being perpendicular thereto.

A first member 410A, a second member 410B, a third member 410C, and a fourth member 410D may be coupled to and interposed between the second and fourth supports 406B, 406D. The first, second, third, and fourth members 410A-410D may be spaced apart equal distances and be positioned perpendicular to the second and fourth supports 406B, 406D.

Further, the first vessel 402 may comprise a first bracket 412A and a second bracket 412B coupled thereto. The first and second brackets 412A, 412B may be generally L-shaped brackets. The first and second brackets 412A, 412B may comprise and couple to one or more first hydraulic cylinders 414 and one or more second hydraulic cylinders 416, respectively. In addition, the one or more first hydraulic cylinders 414 and one or more second hydraulic cylinders 416 may each couple to the second support 406B. The first vessel 402 may also include a first shield 418A, a second shield 418B, and a first shield bracket 420A interposed between the first and second shields 418A, 418B. The first and second shields 418A, 418B may protect one or more third hydraulic cylinders 422, which may be positioned between the first vessel 402 and the first and second shields 418A, 418B. The first shield bracket 420A may receive the one or more third hydraulic cylinders 422. The one or more hydraulic third cylinders 422 may also be coupled to the second support 406B.

Further, the second vessel 404 may comprise a third bracket 412C and a fourth bracket 412D coupled thereto. The third and fourth brackets 412C, 412D may be generally L-shaped brackets. The third and fourth brackets 412C, 412D may comprise and couple to one or more fourth hydraulic cylinders 424 and one or more fifth hydraulic cylinders 426, respectively. In addition, the one or more fourth hydraulic cylinders 424 and one or more fifth hydraulic cylinders 426 may each couple to the fourth support 406D. The second vessel 404 may also include a third shield 418C, a fourth shield 418D, and a second shield bracket 420B interposed between the third and fourth shields 418C, 418D. The third and fourth shields 418C, 418D may protect one or more six hydraulic cylinders 428, which may be positioned between the second vessel 404 and the third and fourth shields 418C, 418D. The second shield bracket 420B may receive the one or more sixth hydraulic cylinders 428. The one or more six hydraulic cylinders 428 may also be coupled to the fourth support 406D. The first axle 408A, second axle 408B, and third axle 408C, with the first, second, third, and fourth members 410A-410D, may rotate back and forth (e.g., teeter totter motion), which allows relative motion energy to be transferred so as to create hydraulic oil pressure via the hydraulic cylinders.

The energy conversion system 400 may also comprise a cabin 430 that may include one or more windows that rests on a platform 432. The platform 432 may comprise a first leg 434A, a second leg 434B, a third leg 434C, and a fourth leg 434D. The first and second legs 434A, 434B may be coupled to the first vessel 402. The third and fourth legs 434C, 434D may be coupled to the second vessel 404. The platform 432 may extend between the first and second vessels 402, 404.

Further, an upper surface of the platform 432 may comprise guardrails 436. The cabin 430 may include mechanical and electrical components, sleeping quarters, etc. The housing, vessels, frame members, cylinders, supports, and any other components may have high solids epoxy primer, urethane topcoats, marine bottom paints, sacrificial zinc anodes, or some combination thereof, which will help prevent most marine growth. It will be appreciated that the energy conversion system 400 may be coupled to other energy conversion systems.

Figure 19:
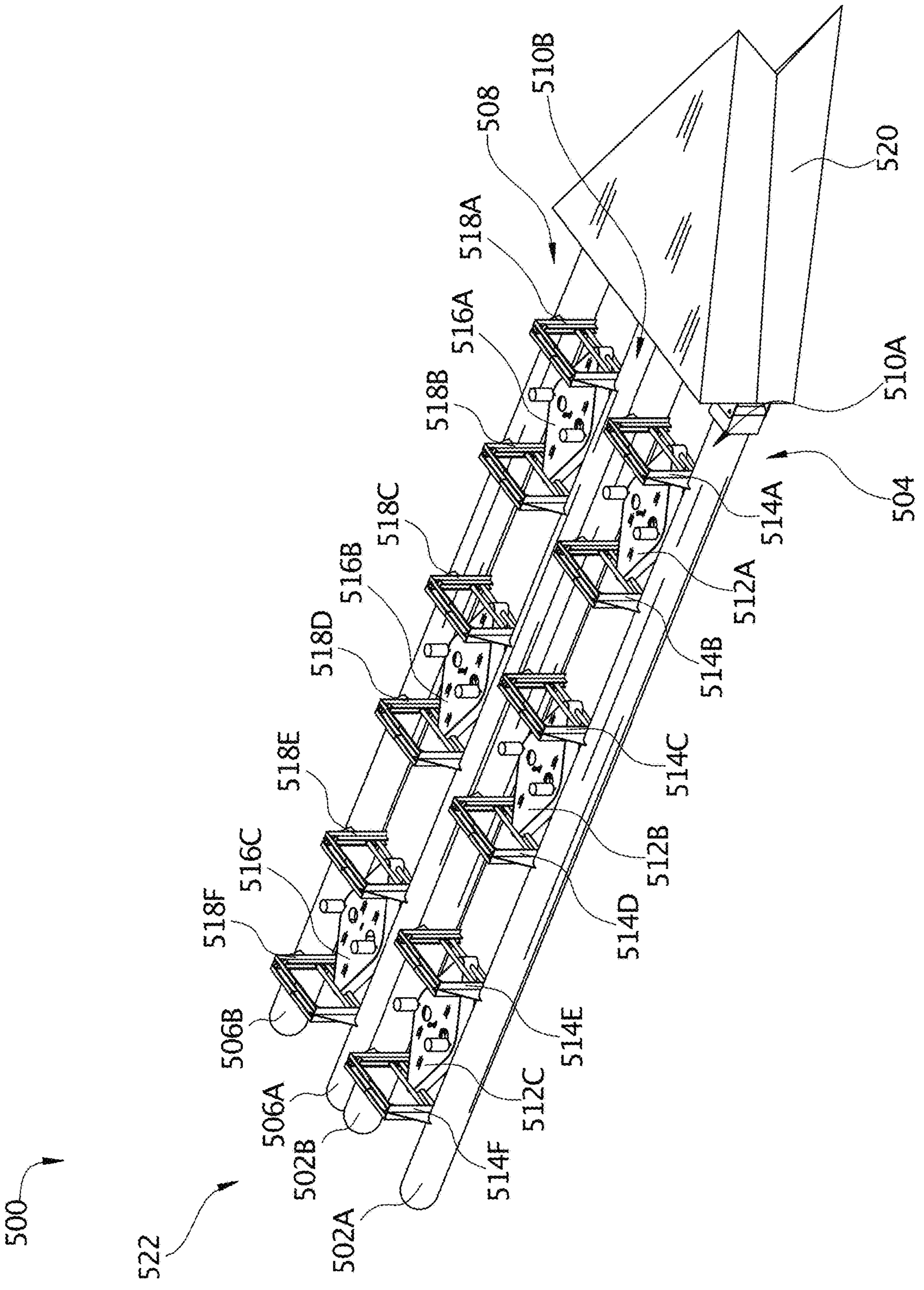
FIG. 19 illustrates a perspective view of an ocean wave and tidal current energy conversion system.
Figure 20:
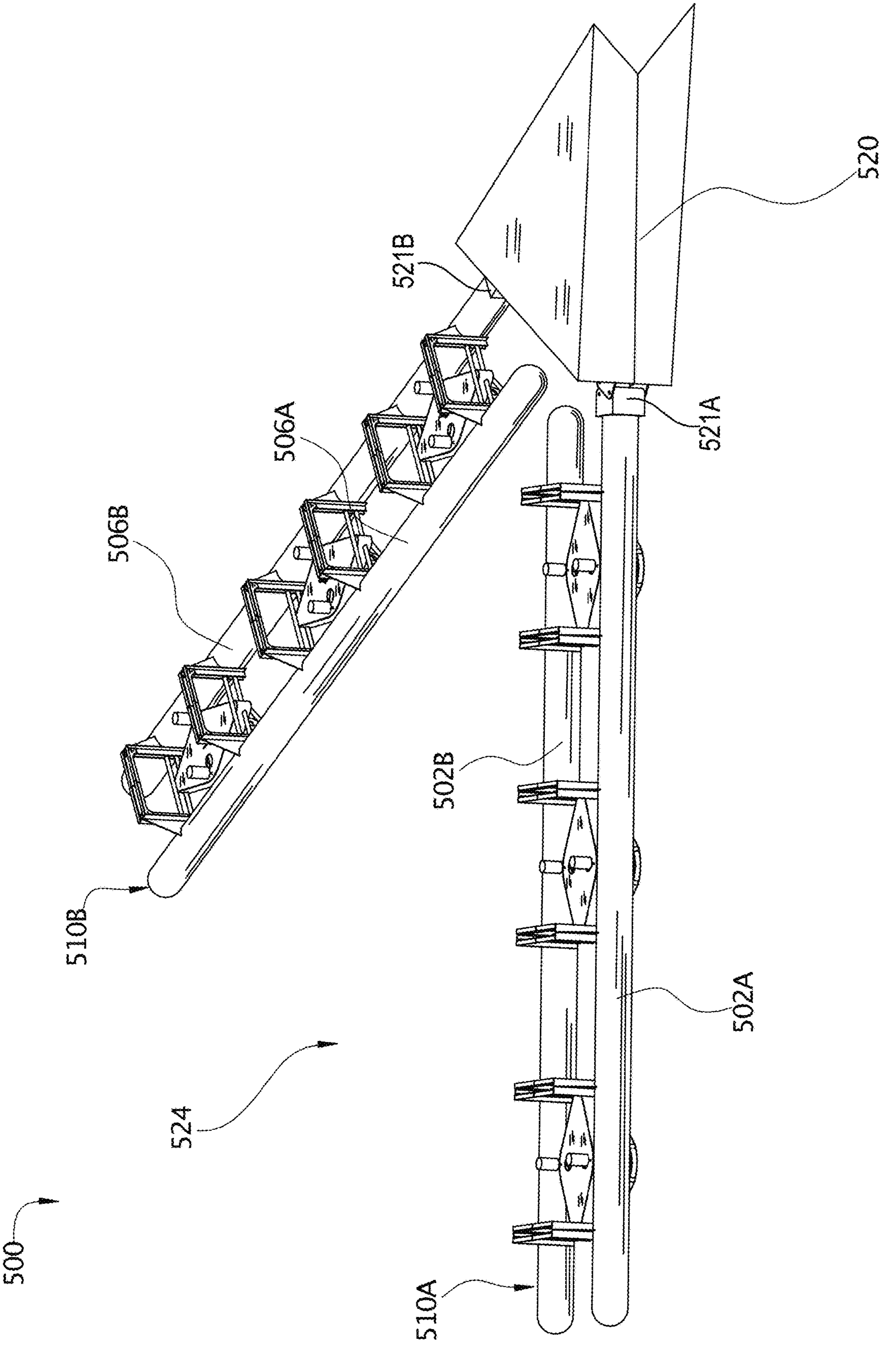
FIG. 20 illustrates a perspective view of an ocean wave and tidal current energy conversion system.
Figure 21:
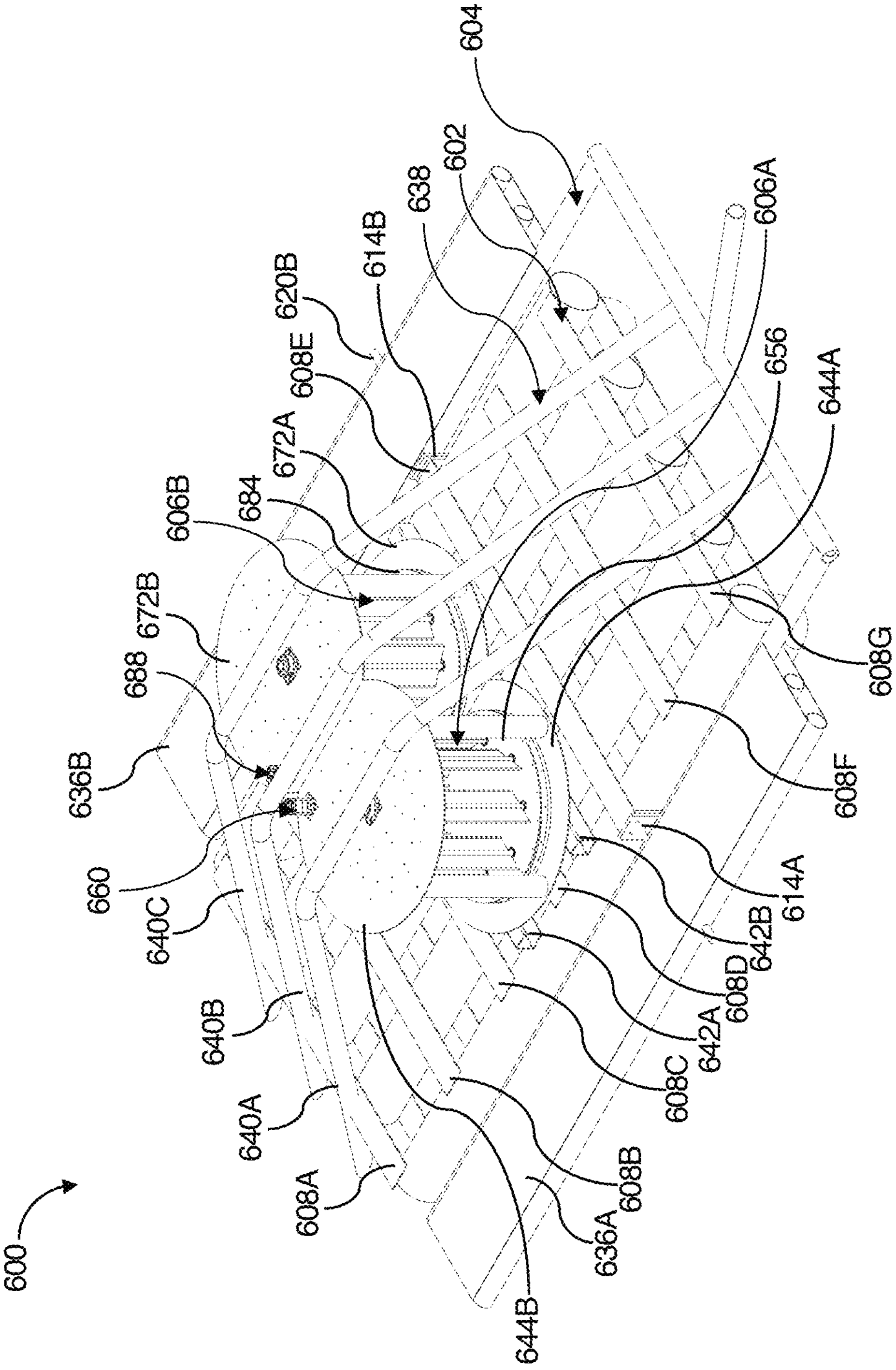
FIG. 21 illustrates a top perspective view of a current energy conversion system.
Figure 22:
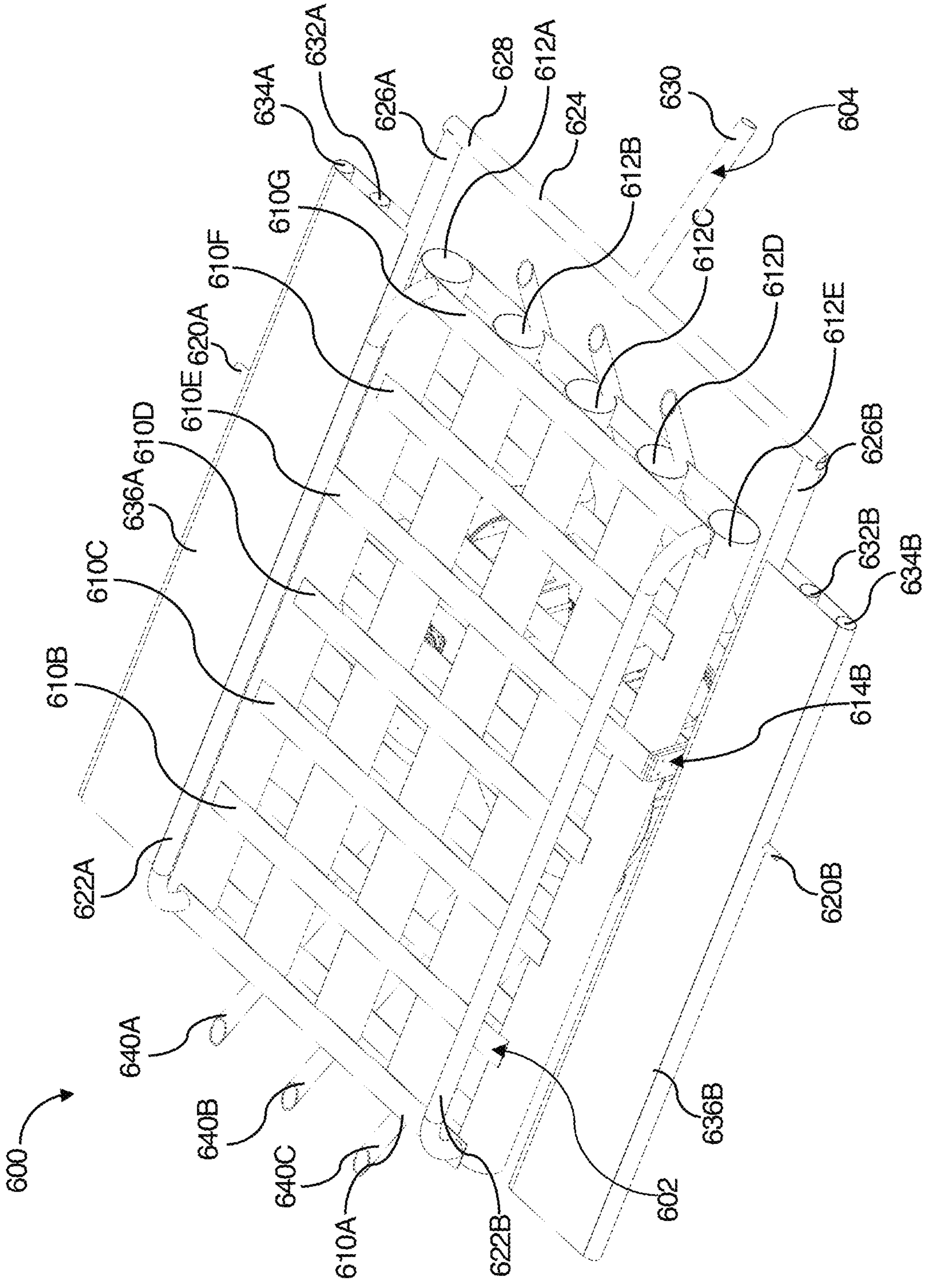
FIG. 22 illustrates a bottom perspective view of a current energy conversion system.
Figure 23:
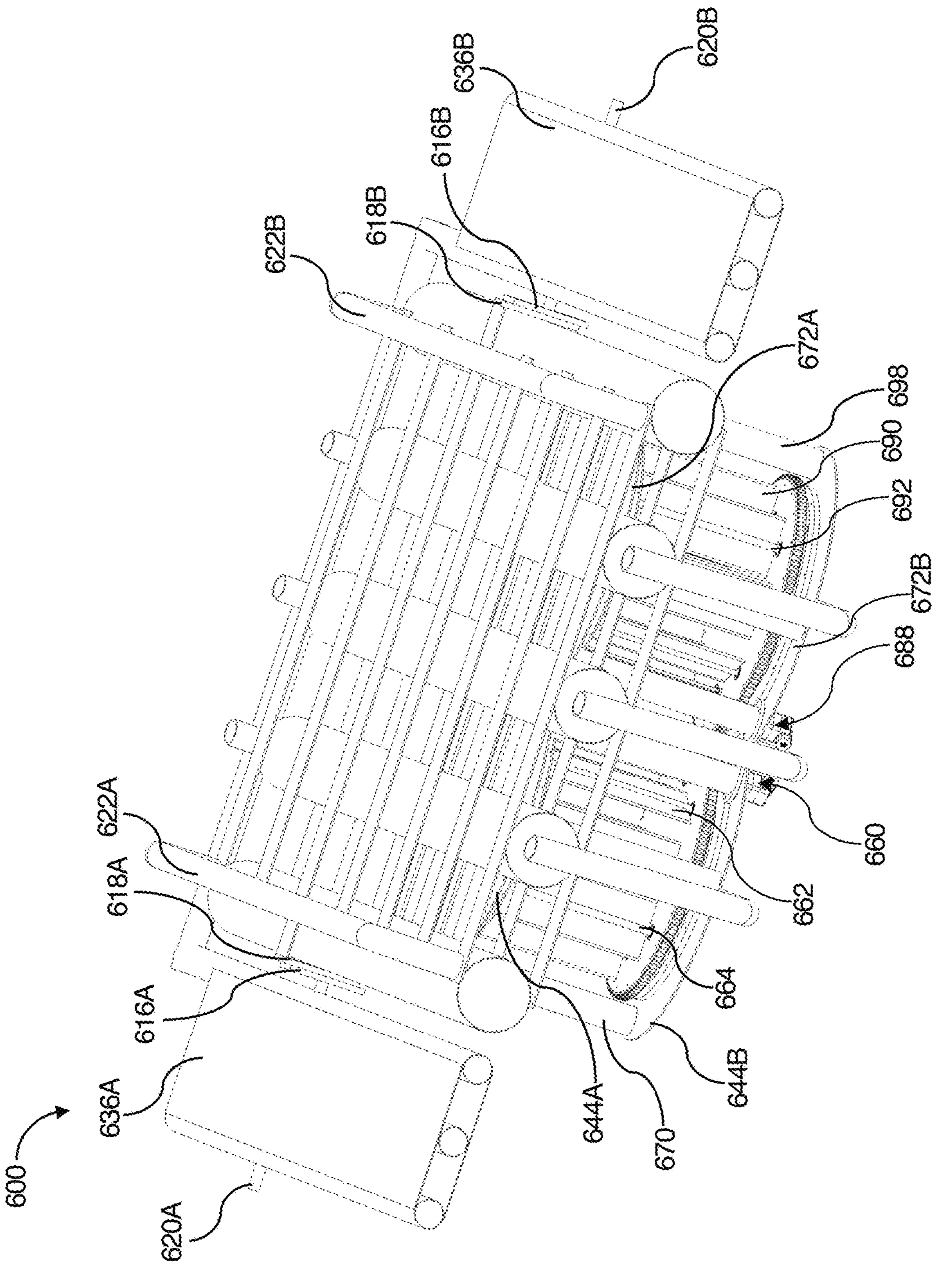
FIG. 23 illustrates a rear perspective view of a current energy conversion system.
Figure 24:
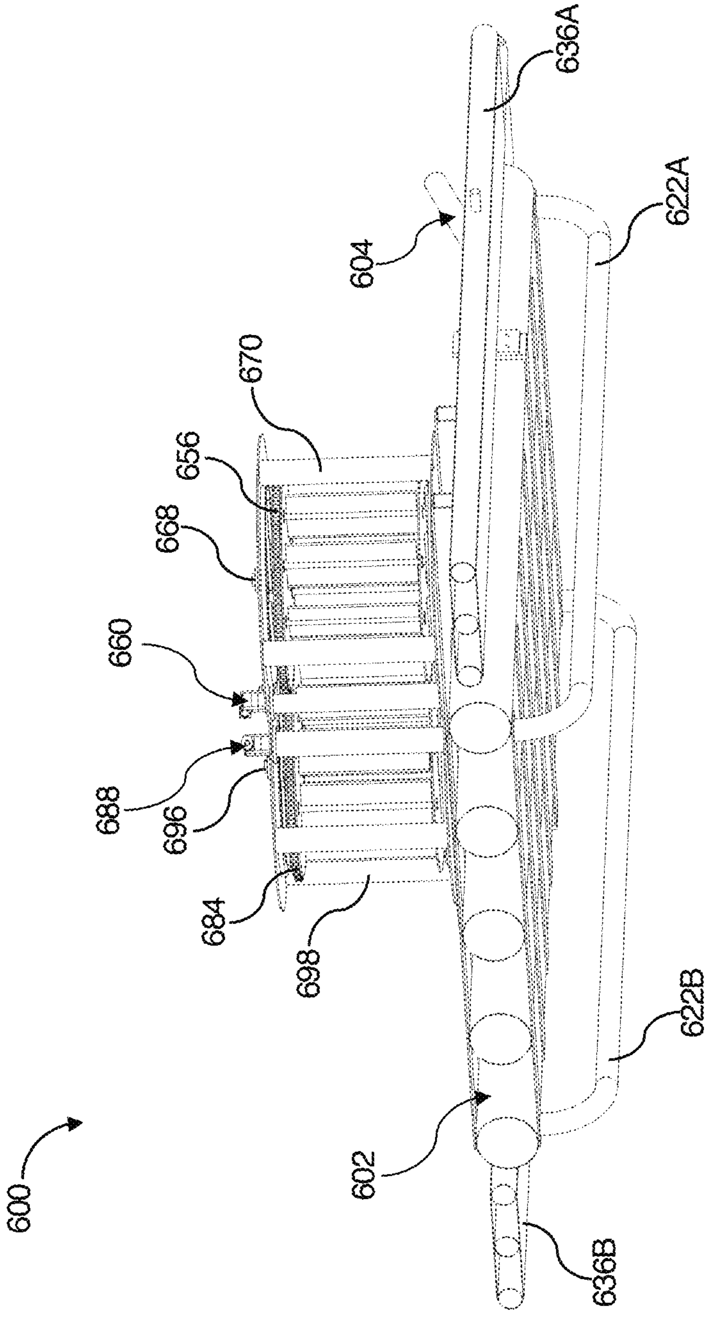
FIG. 24 illustrates a side perspective view of a current energy conversion system.
Figure 25:
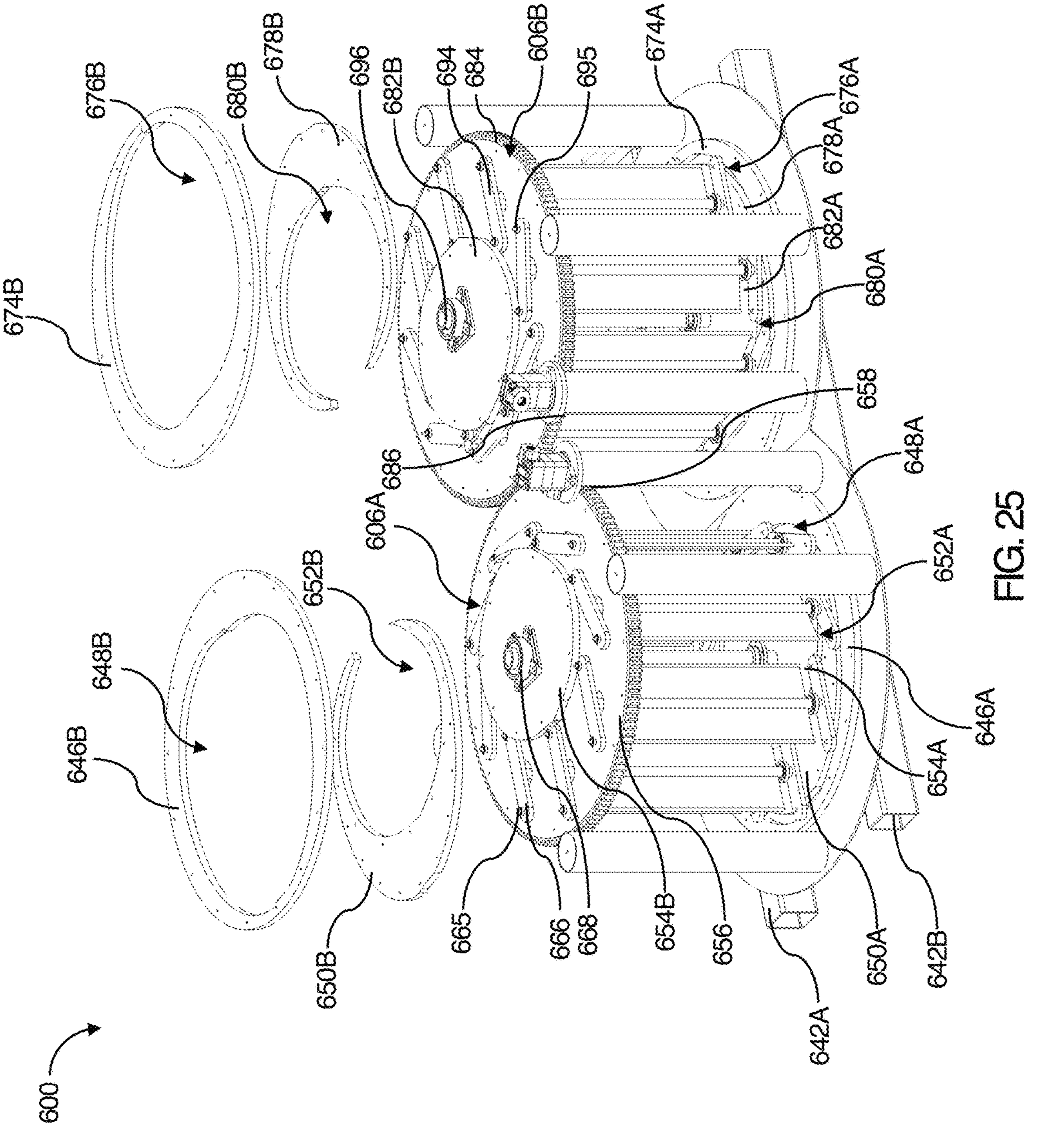
FIG. 25 illustrates a top perspective view of first and second rotating portions of a current energy conversion system.
Figure 26:
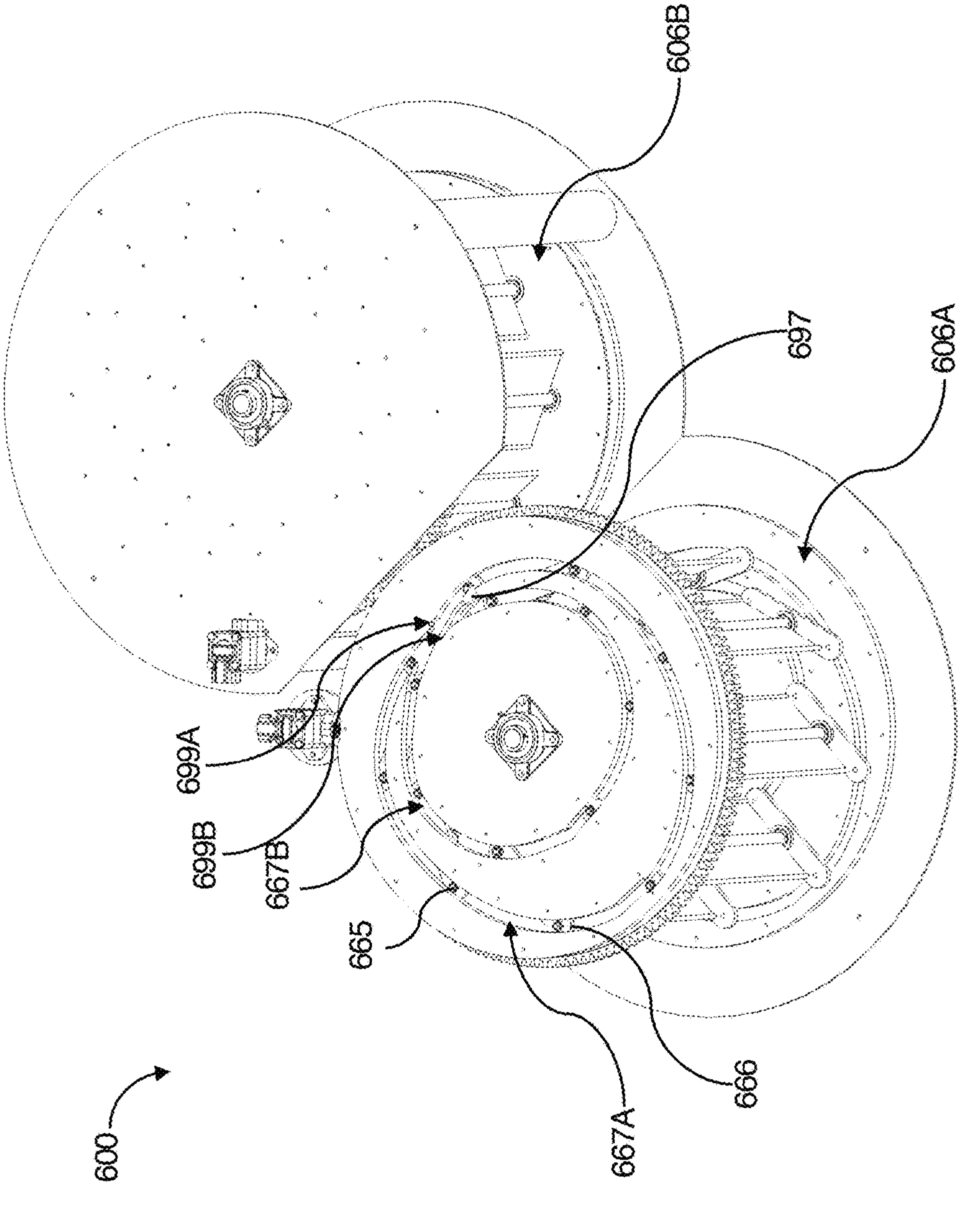
FIG. 26 illustrates a top perspective view of first and second rotating portions of a current energy conversion system.

As shown in FIGS. 19-20, in one embodiment, an energy conversion system 500 may comprise a first vessel 502A and a second vessel 502B on a first side 504 and a third vessel 506A and a fourth vessel 506B on a second side 508. The first and second vessels 502A, 502B may create a first unit 510A, and the third and fourth vessels 506A, 506B may create a second unit 510B. Interposed between the first and second vessels 502A, 502B may be a plurality of first turbines 512A-512C and a plurality of first supports 514A-514F (similar to the turbine 320 and supports 306 as shown in embodiment 300). In addition, interposed between the third and fourth vessels 506A, 506B may be a plurality of second turbines 516A-516C and a plurality of second supports 518A-518F (similar to the turbine 320 and supports 306 as shown in embodiment 300). The first unit 510A and second unit 510B may both be hingedly coupled to a first member 520 via a first hinge bracket 521A and a second hinge bracket 521B, respectively. The first member 520 may be generally triangular in shape and configured to act as an ice breaker bow to deal with break-up ice moving in and out of an inlet. The first and second units 510A, 510B may be in a first position 522, hinged inward, or parallel to each other, for towing the energy conversion system 500 into location and then moved to a second position 524, where the first and second units 510A, 510B are released and spread apart in a generally V-shaped formation.

In some embodiments, the hydraulic oil in the energy conversion system 100, 200, 300, 400, 500 is pumped into a pressure accumulator that removes hydraulic surges and operates an electric generator. The electric generator may power an electrolysis batch system for the production of hydrogen that fills each vessel with hydrogen gas. In some embodiments, the vessels may receive hydrogen gas at a pressure of up to 250 PSI. In other embodiments, the vessels may receive more or less PSI. To transfer the compressed hydrogen, hoses may be used, if the systems are close to the shore, or a tender vessel may transfer hydrogen to a shore location.

The configuration of the energy conversion system 100, 200, 300, 400, 500 in addition to the anchors, allows the system to be aligned with the oncoming waves so as to maximize efficiency of the system 100, 200, 300, 400, 500. Waves and tidal current translate into transferred hydraulic pressure and flow via the system 100, 200, 300, 400, 500. With the pressure and flow, the generators can produce electricity. Then the electricity can be used to produce hydrogen.

As shown in FIGS. 21-26, in one embodiment, an energy conversion system 600 that is configured to be submerged in a river, whether in warm weather or in winter below ice. The energy conversion system 600 comprises a first frame 602 and a second frame 604 that circumscribes and defines the first frame 602. Positioned above the first frame 602 may be a first rotating portion 606A (e.g., a turbine) and a second rotating portion 606B (e.g., a turbine), both of which may be coupled to each other; however, in some embodiments, the first and second rotating portions 606A, 606B may be separated. It will be appreciated that more or less than two rotating portions may be used.

The first frame 602 may include a first upper panel 608A, a second upper panel 608B, a third upper panel 608C, a fourth upper panel 608D, a fifth upper panel 608E, a sixth upper panel 608F, and a seventh upper panel 608G. The first, second, third, fourth, fifth, sixth, and seventh upper panels 608A-608G may be spaced apart from the first end to a second end of the energy conversion system 600. The first, second, third, fourth, fifth, sixth, and seventh upper panels 608A-608G may also extend from a left side to a right side of the first frame 602. Furthermore, the first frame 602 may include a first lower panel 610A, a second lower panel 610B, a third lower panel 610C, a fourth lower panel 610D, a fifth lower panel 610E, a sixth lower panel 610F, and a seventh lower panel 610G. The first, second, third, fourth, fifth, sixth, and seventh lower panels 610A-610G may be spaced apart from the first end to the second end of the energy conversion system 600. The first, second, third, fourth, fifth, sixth, and seventh lower panels 610A-610G may also extend from a left side to a right side of the first frame 602. While shown as panels, it will be appreciated that cylindrical members or anything other shape or size of support may be used. In addition, while seven panels are shown on the upper and lower surfaces of the first frame 602, the first frame 602 may have more or less than seven panels on either surface.

Interposed between and perpendicular to the first, second, third, fourth, fifth, sixth, and seventh upper panels 608A-608G and the first, second, third, fourth, fifth, sixth, and seventh lower panels 610A-610G may be a first support 612A, a second support 612B, a third support 612C, a fourth support 612D, and a fifth support 612E, all of which extend from a first end to a second end of the energy conversion system 600. The first, second, third, fourth, and fifth supports 612A-612E may be cylindrically-shaped. In some embodiments, the first, second, third, fourth, and fifth supports 612A-612E may square-shaped or any other shape.

The fifth upper and lower panels 608E, 610E may be coupled to a first bracket 614A proximate the left side of the first frame 602 and a second bracket 614B proximate the right side of the first frame 602. The first and second brackets 614A, 614B may be perpendicular to ends of the fifth upper and lower panels 608E, 610E. The first bracket 614A may include a first plate 616A and a second plate 618A proximate each other. The first and second plates 616A, 618A may receive fasteners that couple the first and second plates 616A, 618A to the fifth upper and lower panels 608E, 610E. The fasteners may be screws, bolts, etc. In some embodiments, the first and second plates 616A, 618A may be manufactured as a single-unit with the fifth upper and lower panels 608E, 610E. The first bracket 614A may be configured to receive a first shaft 620A and a portion of the second frame 604. The second bracket 614B may include a third plate 616B and a fourth plate 618B proximate each other. The third and fourth plates 616B, 618B may receive fasteners that couple the third and fourth plates 616B, 618B to the fifth upper and lower panels 608E, 610E. The fasteners may be screws, bolts, etc. In some embodiments, the third and fourth plates 616B, 618B may be manufactured as a single-unit with the fifth upper and lower panels 608E, 610E. The second bracket 614B may be configured to receive a second shaft 620B and a portion of the second frame 604.

A lower portion of the first frame 602, that is, at the ends of the first and seventh lower panels 610A, 610G may be a first rail 622A proximate the left side of the first frame 602 and a second rail 622B proximate a right side of the first frame 602. More specifically, the first rail 622A may extend and be coupled to an end of the first lower panel 610A and the same end or side of the seventh lower panel 610G, and the second rail 622B may extend and be coupled to an end of the first lower panel 610A and the same end or side of the seventh lower panel 610G. The first and second rails 622A, 622B may be raised, meaning ends of the rails are angled upward so as to allow a middle section thereof to be raised above an upper surface of the first frame 602. The first and second rails 622A, 622B may be weighted and configured to rest on the river bed and hold the energy conversion system 600 up off the bed.

The second frame 604 may include a main frame 624 that defines three sides of the first frame 602. As such, the main frame 624 may include a first side pipe 626A, a second side pipe 626B, and a front pipe 628 interposed therein between an end of the first and second side pipes 626A, 626B. Extending from the front pipe 628 may be an extension pipe/tongue 630. Proximate the first side pipe 626A, being positioned outward therefrom, may be a third side pipe 632A, and positioned outward from the third side pipe 632A may be a fourth side pipe 634A. A first sleeve 636A may encompass the third side pipe 632A, the fourth side pipe 634A, and substantially all of the first side pipe 626A. The first sleeve 636A may be generally u-shaped and configured to wrap around the first, third, and fourth side pipes 626A, 632A, 634A. Ends of the first sleeve 636A may be opened, not sealed, as well as an inner side of the first sleeve 636A may be opened, not sealed. However, in some embodiments, the first sleeve 636A may be sealed. The first shaft 620A may pass through the first side pipe, the third side pipe, and the fourth side pipe 626A, 632A, 634A, thereby aiding in the securement of the second frame 604 to the first frame 602. Proximate the second side pipe 626B, being positioned outward therefrom, may be a fifth side pipe 632B, and positioned outward from the fifth side pipe 632B may be a sixth side pipe 634B. A second sleeve 636B may encompass the fifth side pipe 632B, the sixth side pipe 634B, and substantially all of the second side pipe 626B. The second sleeve 636B may be generally u-shaped and configured to wrap around the second, fifth, and sixth side pipes 626B, 632B, 634B. Ends of the second sleeve 636B may be opened, not sealed, as well as an inner side of the second sleeve 636B may be opened, not sealed. However, in some embodiments, the second sleeve 636B may be sealed. The second shaft 620B may pass through the second side pipe, the fifth side pipe, and the sixth side pipe 626B, 632B, 634B, thereby aiding in the securement of the second frame 604 to the first frame 602. In some embodiments, the first and second shafts 620A, 620B allow the second frame 604 to be rotatably coupled to the first frame 602, meaning the second frame 604 is capable of rotating or tilting. The first and second sleeves 636A, 636B may be dive planes on the second frame 604. As the extension pipe/tongue 630 goes up and down, so do the first and second sleeves 636A, 636B. In some embodiments, the extension pipe/tongue 630 may be attached to an anchor cable with cable that is five times, or more or less, the depth of the water with a tethered buoy line mid-way and a buoy that floats on the surface. When the anchor is dropped to the bottom, the extension pipe/tongue 630 and the first and second sleeves 636A, 636B are tilted down and the energy conversion system 600 is pulled to the bottom. In order to raise the energy conversion system 600 to the surface, a skiff couples to the float on the tether, and raises the anchor line at the mid position, thus pitching up the first and second sleeves 636A, 636B. While many of the components, such as the first, second, front, third, fourth, fifth, and sixth pipes 626A, 626B, 628, 632A, 632B, 634A, 634B, are pipes, it will be understood that these may be quadrangle, shafts, panels, or any other type of tubing or supports.

An upper section of the second frame 604 may have a cage 638. The cage 638 may be coupled to the front pipe 628 at one end and the first upper panel 608A at an opposite end. The cage 638 may include a first cage support 640A, a second cage support 640B, and a third cage support 640C. Three cage supports are illustrated; however, more or less than three cage supports may be used without departing herefrom. The cage 638 may be configured to add protection to the first and second rotating portions 606A, 606B, with the first, second, and third cage supports 640A-640C passing in front of, over, and behind the first and second rotating portions 606A, 606B. The cage 638 may help prevent debris from passing into the first and second rotating portions 606A, 606B.

The first and second rotating portions 606A, 606B may couple to the upper surface of the first frame 602 via first member 642A and a second member 642B, the first and second members 642A, 642B being fastened to the upper surface of the first frame 602. The first and second members 642A, 642B may be square-tubing or another type of tube, shaft, etc. that can attach to the upper surface of the first frame 602 and receive the first and second rotating portions 606A, 606B. The first and second rotating portions 606A, 606B, or sections thereof, may be capable of rotating 360 degrees. The first rotating portion 606A may include a first lower plate 644A and a first upper plate 644B, both of which define the lower and upper sections of the first rotating portion 606A and may be stationary. Proximate the first lower plate 644A may be a first ring 646A with a first ring aperture 648A, the first ring 646A circumscribes a second ring 650A, that is, the second ring 650A sits inside of the first ring aperture 648A and interacts with the first ring 646A, the second ring 650A may include an outer edge that is configured to match or interact with the edge of the first ring aperture 648A. The second ring 650A may include a second ring aperture 652A. Positioned in the second ring aperture 652A may be a first actuator plate 654A, the first actuator plate 654A may include an outer edge that is configured to match or interact with the edge of the second ring aperture 652A. Proximate the first upper plate 644B may be a third ring 646B with a third ring aperture 648B, the third ring 646B circumscribes a fourth ring 650B, that is, the fourth ring 650B sits inside of the third ring aperture 648B and interacts with the third ring 646B. The fourth ring 650B may include a fourth ring aperture 652B. Positioned in the fourth ring aperture 652B may be a second actuator plate 654B, the second actuator plate 654B may include an outer edge that is configured to match or interact with the edge of the fourth ring aperture 652B. The aforementioned rings and plates assist the energy conversion system 600 in rotation and generating energy from river current. Positioned below the second actuator plate 654B may be a first gear plate 656, meaning a plate with a plurality of first gear teeth. The plurality of first teeth may be engaged by a second smaller gear plate 658. The second gear plate 658 may be coupled to a first actuator system 660, the second gear plate 658 is configured to engage and rotate from the first gear plate 656, thereby transferring energy through the first actuator system 660. Interposed between the first lower and upper plates 644A, 644B may be first blades 662 that may be rotatably coupled to the first rotating portion 606A via first blade axles 664. The first blade axles 664 may be coupled to the rings and actuator plate on their upper end and on an upper surface of the first gear plate 656 with first blade brackets 666 and fasteners 665 (e.g., pins, two pins on each end of the brackets 666). The fasteners 665 may include a bearing and pins that are positioned in tracks 667A, 667B created between the one or more of the rings and/or actuator plate. The first blade axles 664 pass through apertures on the first gear plate 656 and secured to an upper surface thereof. The first blades 662 may be configured to rotate based on the direction of the river current so as to get the most efficient rotation of the first rotating portion 606A, thus creating the most energy. A first central axle 668 may be positioned between and fastened to at least the first actuator plate 654A and the second actuator plate 654B. The first central axle 668 is configured to allow the first rotating portion 606A to rotate. A plurality of first rotating portion supports 670 that are stationary and may be positioned around the circumference of the first rotating portion 606A. The plurality of first rotating portion supports 670 may be configured to prevent debris from reaching the first blades 662. One of the plurality of first rotating portion supports 670 may house a portion of the first actuator system 660.

The second rotating portion 606B may include a second lower plate 672A and a second upper plate 672B, both of which define the lower and upper sections of the second rotating portion 606B and may be stationary. Proximate the second lower plate 672A may be a fifth ring 674A with a fifth ring aperture 676A, the fifth ring 674A circumscribes a sixth ring 678A, that is, the sixth ring 678A sits inside of the fifth ring aperture 676A and interacts with the fifth ring 674A, the sixth ring 678A may include an outer edge that is configured to match or interact with the edge of the fifth ring aperture 676A. The sixth ring 678A may include a sixth ring aperture 680A. Positioned in the sixth ring aperture 680A may be a third actuator plate 682A, the third actuator plate 682A may include an outer edge that is configured to match or interact with the edge of the sixth ring aperture 680A. Proximate the second lower plate 672A may be a seventh ring 674B with a seventh ring aperture 676B, the seventh ring 674B circumscribes an eighth ring 678B, that is, the eighth ring 678B sits inside of the seventh ring aperture 676B and interacts with the seventh ring 674B. The eighth ring 678B may include an eighth ring aperture 680B. Positioned in the eighth ring aperture 680B may be a fourth actuator plate 682B, the fourth actuator plate 682B may include an outer edge that is configured to match or interact with the edge of the eighth ring aperture 680B. The aforementioned rings and plates assist the energy conversion system 600 in rotation and generating energy from the river current. Positioned below the fourth actuator plate 682B may be a third gear plate 684, meaning a plate with a plurality of second gear teeth. The plurality of second teeth may be engaged by a fourth smaller gear plate 686. The fourth gear plate 686 may be coupled to a second actuator system 688, the fourth gear plate 686 is configured to engage and rotate from the second rotating portion 606B, thereby transferring energy through the second actuator system 688. Interposed between the second lower and upper plates 672A, 672B may be second blades 690 that may be rotatably coupled to the second rotating portion 606A via second blade axles 692. The second axles 692 may be coupled to the rings and actuator plate on their upper end and on an upper surface of the third gear plate 684 with blade brackets 694 and fasteners 695 (e.g., pins, two pins on each end of the brackets 694). The fasteners 695 may include a bearing and pins that are positioned in tracks, similar to the tracks illustrated on the first rotating portion 606A, created between the one or more of the rings and/or actuator plate. The second blade axles 692 pass through apertures on the third gear plate 684 and secured to a bottom thereof. The second blades 690 may be configured to rotate based on the direction of the river current so as to get the most efficient rotation of the second rotating portion 606B. A second central axle 696 may be positioned between and fastened to at least the third actuator plate 682A and the fourth actuator plate 682B. The second central axle 696 is configured to allow the second rotating portion 606B to rotate. A plurality of second rotating portion supports 698 that are stationary and may be positioned around the circumference of the second rotating portion 606B. The plurality of second rotating supports 698 may be configured to prevent debris from reaching the second blades 690. One of the plurality of second rotating supports 698 may house a portion of the second actuator system 688.

The energy conversion system 600 may function as described below. The first and second blades 662, 690 (i.e., paddles) may include the fasteners 665, 695 on both the top end and the bottom end of the first and second blades 662, 690, These fasteners 665, 695 are in line with the outer edges of each of the first and second blades 662, 690. These fasteners 665, 695 are in a track that controls the pitch of the paddle relative to the water flow. The first and second blades 662, 690 are crossways to the flow of water to rotate the first and second rotating portions 606A, 606B and then the first and second blades 662, 690 rotate on their axles 664, 692 to align with the flow as they advance into the flow of water. In order to maximize the efficiency of the first and second rotating portions 606A, 606B, it is essential that the first and second blades 662, 690 rotate on their own via the axles 664, 692 so on each revolution the leading edge becomes the trailing edge on the next revolution. This is accomplished by having a track switching mechanism that is triggered by the fasteners 665, 695 on each blade 662, 690. The advancing fasteners 665, 695 contact a track switch rocker arm 697, with a base and a hingedly coupled finger, which deflects the leading fastener 665, 695 on the track, and the trailing fastener 665, 695 on a track that results in the trailing edge becoming the leading edge for that cycle, and continues to switch back and forth with every revolution. In addition to this track switching rocket arm component/rocker arm 697, there is a safeguard in the track which assures that the blades 662, 690 cannot be jammed when the blades 662, 690 are in its absolute 90 degrees to water flow position, and then proceeds to transition towards its 0-degree position. This safeguard is accomplished by an indent or detent 699A, 699B in the track that momentarily halts the outer edge of the blades 662, 690 in its circumference around the center axis of the first and second rotating portions 606A, 606B, while the inner edge of the blades 662, 690 continue to rotate on the axles 664, 692 and pulls the outer fastener 665, 695 out of the indent so the rotation can continue uninterrupted.

It will be appreciated that the energy conversion system 600 may be a basic blade wheel concept where the blades, as discussed above, align with the water flow when they advance into the current and are cross ways to the water flow on the power side. The energy conversion system 600 is configured to be sunk to the bottom of a river so that in the winter, the ice is over the top and the system 600 can continue making power. Hydraulic pumps may be placed under water with hoses going to the shore where the hydraulic reservoirs are located as well as the motor and generator.

Figure 10:
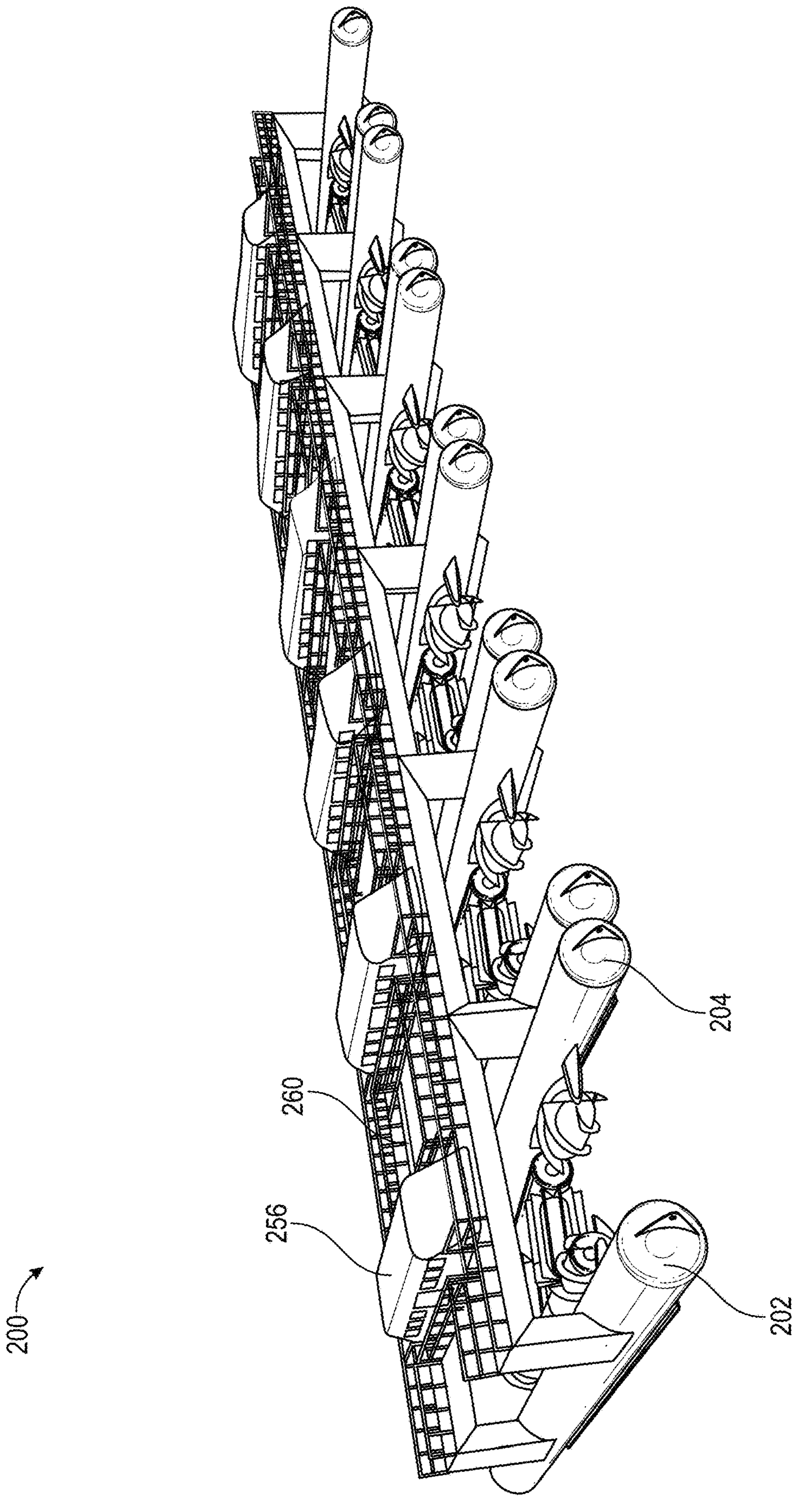
FIG. 10 illustrates a perspective view of multiple ocean wave and tidal current energy conversion systems.

It will be appreciated that the energy conversion system 100, 200, 300, 400, 500 may be coupled to other energy conversion systems to create a breakwater (shown in FIG. 10). In some embodiments, the legs of the platforms may be coupled together so that a user may have a continuous platform to walk from system to system. The breakwater may help create better ecosystems for the aquatic species, calmer area for tourists or recreationists, and prevents shore erosion. There are many benefits that come from the energy conversion system 100, 200, 300, 400, 500 some of which may include the following: no carbon footprint; oxygen is a byproduct of electrolysis; hydrogen is produced by existing energy and not hydrocarbon; when hydrogen is burned, water is created; any internal combustion engine that now uses hydrocarbons for fuel can use hydrogen which utilizes all forms of existing engines; cost effective; and available carbon credits as a tax benefit.

Further, in some embodiments, the energy conversion system 100, 200, 300, 400, 500 may comprise solar panels positioned on the platform, cabin, etc. In some embodiments, the energy conversion system 100, 200, 300, 400, 500 may comprise windmills positioned on the platform, cabin, etc.

It will be understood that while various embodiments have been disclosed herein, other embodiments are contemplated. Further, certain embodiments of the present disclosure may include, incorporate, or otherwise comprise properties or features described in other embodiments. Consequently, various features of certain embodiments can be compatible with, combined with, included in, and/or incorporated into other embodiments of the present disclosure. Therefore, disclosure of certain features or components relative to a specific embodiment of the present disclosure should not be construed as limiting the application or inclusion of said features or components to the specific embodiment unless stated. As such, other embodiments can also include said features, components, members, elements, parts, and/or portions without necessarily departing from the scope of the present disclosure.

The embodiments described herein are examples of the present disclosure. Accordingly, unless a feature or component is described as requiring another feature or component in combination therewith, any feature herein may be combined with any other feature of a same or different embodiment disclosed herein. Although only a few of the example embodiments have been described in detail herein, those skilled in the art will appreciate that modifications are possible without materially departing from the present disclosure described herein. Accordingly, all modifications may be included within the scope of this invention.

What is claimed is:

1. An energy conversion system comprising:

a first frame;

a second frame rotatably coupled to the first frame, the second frame comprising:

a main frame;

a first sleeve that couples to the main frame and to the first frame via a first shaft, the first sleeve spanning the length of the first frame, wherein the first sleeve is a dive plane that is rotatably coupled to the main frame;

a second sleeve that couples to the main frame and to the first frame via a second shaft, the first sleeve spanning the length of the first frame, wherein the second sleeve is a dive plane that is rotatably coupled to the main frame;

wherein the second frame is rotatably coupled to the first frame via the first shaft and the second shaft;

one or more rotating portions comprising:

lower and upper plates, rings positioned proximate to both the lower and upper plates, actuator plates positioned within the rings, gear plates positioned proximate the ring adjacent the upper plates, blades coupled to blade brackets via blade axles, the blade brackets being coupled to an upper and a lower end of each blade, each blade having two bearings and pins, wherein the two bearings and pins are positioned within first and second tracks created between the rings and actuator plates, a central axle.

2. The energy conversion system of claim 1, wherein the first frame comprises a first rail and a second rail, each being spaced apart and coupled to a lower surface of the first frame, the first rail and the second rail are both weighted.

3. The energy conversion system of claim 1, further comprising a plurality of rotating supports that surround the one or more rotating portions.

4. The energy conversion system of claim 1, wherein an edge of the actuator plates and an edge of the rings include indents.

5. An energy conversion system comprising:

a first frame comprising:

a plurality of panels and a plurality of supports;

a first rail and a second rail, each being coupled to a lower surface of the first frame;

a second frame rotatably coupled to the first frame, the second frame comprising:

a main frame;

a first sleeve with one or more first pipes, the first sleeve couples to the main frame and the first frame via a first shaft;

a second sleeve with one or more second pipes, the second sleeve couples to the main frame and the first frame via a second shaft;

wherein the second frame is rotatably coupled to the first frame via the first shaft and the second shaft;

one or more rotating portions each comprising:

a lower plate;

a first ring proximate to the lower plate, the first ring comprising a first ring aperture;

a second ring being placed in the first ring aperture, the first ring surrounding the second ring, wherein the second ring comprises a second ring aperture;

a first actuator plate positioned within the second ring aperture;

an upper plate;

a third ring proximate to the upper plate, the third ring comprising a third ring aperture;

a fourth ring being placed in the third ring aperture, the third ring surrounding the fourth ring, wherein the fourth ring comprises a fourth ring aperture;

a second actuator plate positioned within the fourth ring aperture;

blades positioned between the lower and upper plates, each blade comprising a first bracket with first bearings at a lower end of the blade and a second bracket with second bearings at an upper end of the blade;

first tracks positioned between the first ring and the second ring and the second ring and the first actuator plate, and second tracks positioned between the third ring and the fourth ring and the fourth ring and the second actuator plate, wherein the first and second tracks slidably receive the first bearings and the second bearings, respectively;

a first track switch rocker arm positioned in the first tracks that moves the first bracket and moves the first bearings to a different track with every rotation of the rotating portion;

a second track switch rocker arm positioned in the second tracks that moves the second bracket and moves the second bearings to a different track with every rotation of the rotating portion; and a central axle.

* * * * *